(12) United States Patent
Nonahal

(10) Patent No.: US 12,187,175 B1
(45) Date of Patent: Jan. 7, 2025

(54) TOW TRUCK WHEEL LIFT ASSEMBLIES

(71) Applicant: Iman Nonahal, Tarzana, CA (US)

(72) Inventor: Iman Nonahal, Tarzana, CA (US)

( * ) Notice: Subject to any disclaimer, the term of this patent is extended or adjusted under 35 U.S.C. 154(b) by 122 days.

(21) Appl. No.: 17/561,296

(22) Filed: Dec. 23, 2021

Related U.S. Application Data

(60) Provisional application No. 63/172,621, filed on Apr. 8, 2021, provisional application No. 63/130,350, filed on Dec. 23, 2020.

(51) Int. Cl.
*B60P 1/48* (2006.01)
*B60P 3/075* (2006.01)
*F15B 15/14* (2006.01)

(52) U.S. Cl.
CPC ............... *B60P 1/48* (2013.01); *B60P 3/075* (2013.01); *F15B 15/1423* (2013.01)

(58) Field of Classification Search
CPC .......... B60P 1/48; B60P 3/075; F15B 15/1423
See application file for complete search history.

(56) References Cited

U.S. PATENT DOCUMENTS

| | | | |
|---|---|---|---|
| 4,264,262 A | 4/1981 | LoCodo | |
| 4,265,463 A | 5/1981 | Perruso | |
| 4,383,807 A | 5/1983 | Bubik | |
| 4,384,817 A | 5/1983 | Peterson | |
| 4,473,237 A | 9/1984 | Lind | |
| 4,564,207 A | 1/1986 | Russ et al. | |
| 4,678,392 A | 7/1987 | Capers et al. | |
| 4,679,978 A | 7/1987 | Holmes et al. | |
| 4,761,111 A | 8/1988 | Brown | |
| 4,793,763 A | 12/1988 | Bubik | |
| 4,798,509 A | 1/1989 | Bubik | |
| 4,815,915 A | 3/1989 | Crupi, Jr. | |
| 4,836,737 A * | 6/1989 | Holmes | B60P 3/125 414/563 |
| 4,861,221 A | 8/1989 | Krisa | |
| 4,874,285 A | 10/1989 | Bubik | |
| 4,968,052 A | 11/1990 | Alm et al. | |

(Continued)

FOREIGN PATENT DOCUMENTS

WO   WO-8400929 A  *  3/1984  ............. B60P 3/125

OTHER PUBLICATIONS

Author unknown, "The Speed Dolly Operations Manual, Covering Models: ITD2490 XD Dolly Set, ITD2478 Speed Dolly Set, and ITD2480 Speed Dolly Set," In The Ditch Towing Products, ITD0163-R2, Date Unknown but before Dec. 23, 2020, pp. 1-20.

*Primary Examiner* — Lynn E Schwenning
*Assistant Examiner* — Lucia Elba Rodriguez
(74) *Attorney, Agent, or Firm* — Makoui Law, PC; Ali Makoui

(57) ABSTRACT

A hydraulic system of a tow truck comprises first and second hydraulic wheel lift assemblies. The first hydraulic wheel lift is used to lift the two wheels of a vehicle that are closer to the tow truck. The second hydraulic wheel lift extends below the first hydraulic wheel lift to reach the other two wheels of the vehicle that are farther from the tow truck. The first and second hydraulic wheel lifts include wheel retainers to hold the corresponding wheels of the vehicle. The wheel retainers of the second hydraulic wheel lift include shafts that are attached to towing wheels to hold the wheels of the vehicle that are farther from the tow truck above the ground.

17 Claims, 23 Drawing Sheets

(56) References Cited

U.S. PATENT DOCUMENTS

| | | | |
|---|---|---|---|
| 5,013,209 A * | 5/1991 | DeMichele | B60P 3/127 |
| | | | 414/595 |
| 5,061,147 A | 10/1991 | Nespor | |
| 5,169,278 A | 12/1992 | Hoechst et al. | |
| 5,350,271 A | 9/1994 | Weller | |
| 5,354,167 A | 10/1994 | Cullum et al. | |
| 5,692,871 A | 12/1997 | Nespor | |
| 5,709,522 A | 1/1998 | Cullum | |
| 5,722,810 A | 3/1998 | Young et al. | |
| 5,762,465 A * | 6/1998 | Zackovich | B60P 3/125 |
| | | | 280/402 |
| 5,908,280 A | 6/1999 | Allison | |
| 5,988,974 A | 11/1999 | Zackovich | |
| 6,139,250 A | 10/2000 | Nolasco | |
| 6,443,685 B1 | 9/2002 | Maeno | |
| 7,153,082 B2 * | 12/2006 | Nolasco | B60P 3/125 |
| | | | 414/800 |
| 7,275,753 B1 | 10/2007 | Ceccarelli et al. | |
| 7,494,313 B2 | 2/2009 | Craze | |
| 7,673,887 B2 | 3/2010 | Hassell | |
| 8,657,305 B1 | 2/2014 | Hassell | |
| 9,440,577 B2 | 9/2016 | McConnell et al. | |
| 10,486,581 B2 * | 11/2019 | Collazo | B60P 3/125 |
| 2003/0082038 A1 | 5/2003 | Nolasco | |
| 2004/0156706 A1 | 8/2004 | Weller et al. | |
| 2005/0220598 A1 | 10/2005 | Shubert | |
| 2011/0150613 A1 | 6/2011 | Hwang | |
| 2013/0022435 A1 | 1/2013 | Bannon et al. | |

* cited by examiner

TOW TRUCK WHEEL LIFT ASSEMBLIES

CLAIM OF BENEFIT TO PRIOR APPLICATIONS

This application claims the benefit of U.S. Provisional Patent Application Ser. No. 63/130,350, filed on Dec. 23, 2020, and U.S. Provisional Patent Application Ser. No. 63/172,621, filed on Apr. 8, 2021. The contents of U.S. Provisional Patent Application 63/130,350, and U.S. Provisional Patent Application 63/172,621 are hereby incorporated by reference.

BACKGROUND

Tow trucks, also referred to as recovery vehicles or wreckers, are vehicles used to move other motor vehicles, for example, to tow vehicles involved in accidents, impounded, disabled, etc. Different styles of tow trucks include wheel-lift, flatbed, boom, self-loader, hook and chain, and integrated tow trucks. A wheel-lift tow truck uses a metal yoke hooked under the drive wheels of a vehicle and picks up the drive wheels of the vehicle clear of the ground by a hydraulic lift. The hook and chain tow trucks, which are not widely used anymore, work similar to the wheel-lift tow trucks, except for having a hook that is secured to a vehicle's axle or bumper and having chains that go around the frame of the vehicle to lift the drive wheels of the vehicle. The flatbed tow trucks have a bed that may be inclined to allow a vehicle to be driven or pulled on the bed. A boom tow truck has a boom with a winch to recover vehicles from ditches. Integrated tow trucks include both a boom and a wheel lift system.

Many of the above-mentioned tow trucks use hydraulic lifts and booms that use liquid fluid to perform work. The hydraulic fluid is pumped to hydraulic motors and cylinders and becomes pressurized under resistance in a closed system. The fluid used in a hydraulic fluid is not compressible and may transmit any pressure applied to the fluid in the closed system in all directions.

BRIEF DESCRIPTION OF THE DRAWINGS

The various embodiments of the present tow truck wheel lift assemblies now will be discussed in detail with an emphasis on highlighting the advantageous features. These embodiments depict the novel and non-obvious tow truck wheel lift assemblies shown in the accompanying drawings, which are for illustrative purposes only. These drawings include the following figures, in which like numerals indicate like parts.

DETAILED DESCRIPTION

Figure 1A:
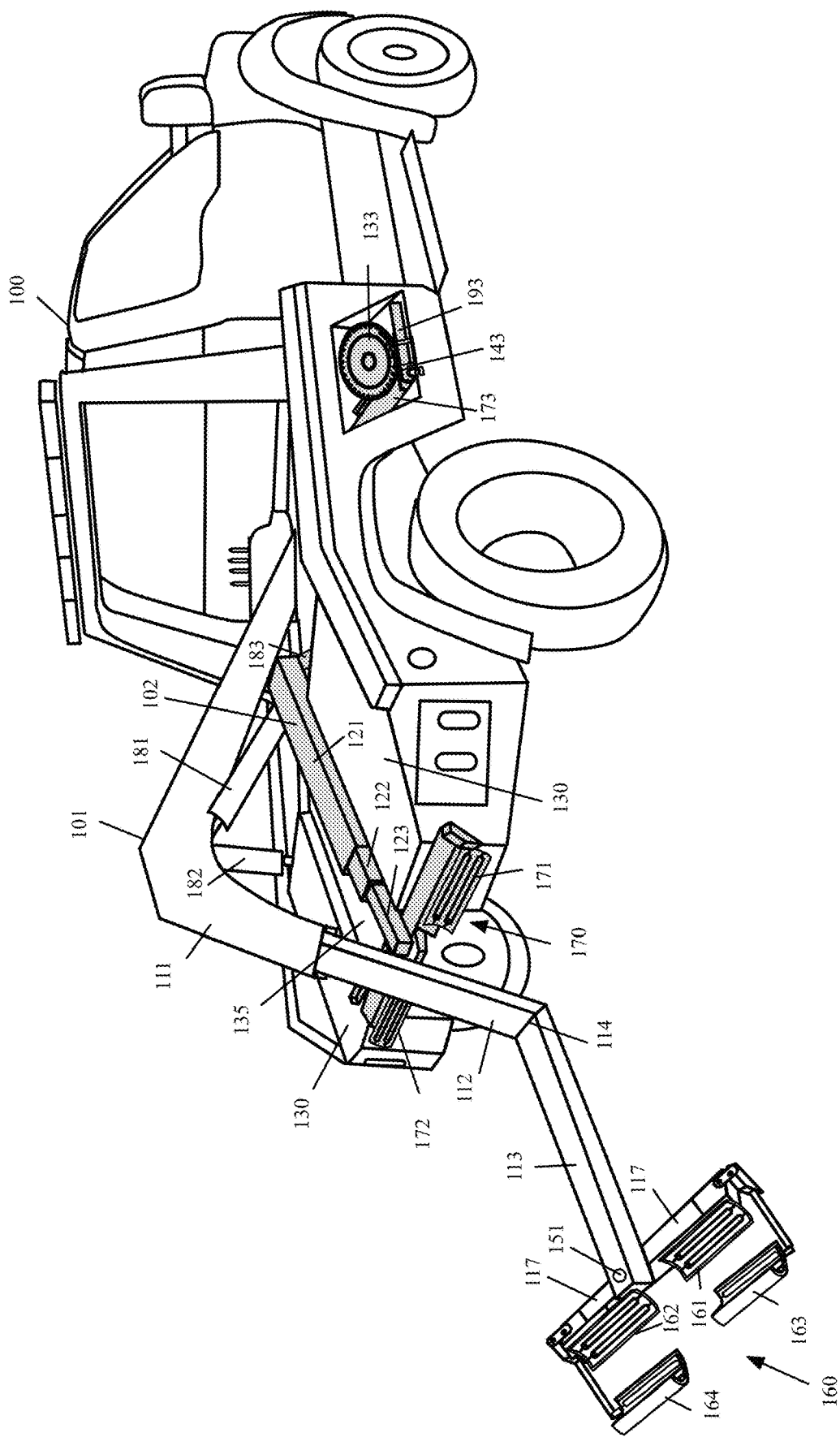
FIGS. 1A-1B are side perspective views of a tow truck with a first hydraulic wheel lift assembly for lifting a first pair of wheels of a vehicle and a second hydraulic wheel lift assembly for attaching the other pair of wheels of the vehicle to towing wheels, according to various aspects of the present disclosure.

One aspect of the present embodiments includes the realization that the existing wheel-lift tow trucks use only one hydraulic wheel lift to lift one pair of the wheels of a vehicle that is being towed. If the vehicle is a two-wheel drive vehicle and the driving wheels of the vehicle are lifted up, the other two wheels may stay on the ground during towing. However, the other two wheels may have to be lifted if the vehicle is all-wheel drive or the wheels are damaged (e.g., in an accident). The other two wheels are typically lifted off the ground (e.g., by a jack) and are placed on towing wheels. A more recent way of lifting the other two wheels of a vehicle is using a so-called tow dolly (or self-loading dolly) to lift the wheels.

Using a jack for placing the towing wheels under the vehicle is time consuming and wastes the tow truck driver's time. Using tow dollies require placing two axels underneath the vehicle on each side of the pair of wheels that are farther from the tow truck and are going to be lifted up by the tow dollies. The axels then have to be extended to span the width of the vehicle. One tow dolly has to be connected to each side of axels. The tow dollies have to be secured by passing ratchet straps behind the vehicle's wheels and attaching the hook ends of the straps to the tow dollies.

In addition to being time consuming to setup, the jacks and the tow dollies are heavy. For example, each tow dolly used for lifting one wheel of a vehicle may weight more than 50 pounds. Each time a vehicle is being towed, the tow truck driver has to pick up two tow dollies and two axels. The tow dollies have to be placed on each side of the car and have to be connected to each other by the two axels that are extended below the frame of the car. After the towing is done, the tow dollies and the axels have to be picked up and placed back on the tow truck. Repeatedly lifting the jack or the tow dollies from the tow truck bed and placing them back may cause injuries such as, back injuries, joint injuries, etc., to the tow truck drivers.

The present embodiments, as described in detail below, solve the above-mentioned problems by providing a second hydraulic wheel lift assembly for the wheel-lift tow trucks. The first hydraulic wheel lift assembly may be used as a traditional hydraulic wheel lift assembly to lift the two wheels of a vehicle that are closer to the tow truck. The second hydraulic wheel lift may then extend below the first hydraulic wheel lift assembly to reach the two wheels of the vehicle that are farther from the tow truck. The first and second hydraulic wheel lift assemblies may include wheel retainers for holding the corresponding wheels of the vehicle that are being lifted by the first and second hydraulic wheel lifts.

The wheel retainers of the second hydraulic wheel lift assembly may include shafts that may be attached to the towing wheels for holding the wheels of the vehicle that are farther from the tow truck above the ground. The only relatively heavy items that are lifted by the tow truck driver are the small towing wheels attached to the corresponding portions of the wheel retainers. The use of the second hydraulic wheel lift assembly, therefore, provides safety for the tow truck drivers and reduces the time to prepare a vehicle for towing.

Another aspect of the present embodiments includes the realization that the existing tow trucks use wheel retainers that include a wheel grid, which is attached to the tow truck's hydraulic wheel lift assembly, and an attachable L-shaped bar to hold the two sides of a vehicle's wheel for lifting up the wheel. The wheel grid is a substantially rectangular object with a slanted surface attached to one of its sides. To prepare a vehicle's wheels for lifting, the hydraulic wheel lift assembly is lowered such that the slanted surface touches the side of wheel that is closer to the tow truck. One side of the L-shaped bar is then placed on the opposite side of the wheel. The other side of the L-shaped bar is attached to the hydraulic wheel lift assembly and is tightened such that the wheel may not be able to turn. The same process is repeated with another wheel of the vehicle and both wheels are then lifted by the hydraulic wheel lift assembly.

For an all-wheel drive vehicle, the other two wheels of the vehicle have to also be lifted and placed on towing wheels to prevent damage to the drivetrain of the vehicle during towing. However, in some situations, the other two wheels may have to be temporarily taken off the towing wheels and placed on the ground during periods of towing. For example, when the vehicle is in a subterranean parking with a steep ramp, the portion of the vehicle that is over the towing wheels may not clear the ramp.

In these situations, when the vehicle is being towed by the existing tow trucks, the two wheels that are placed over the towing wheels have to be put back on the ground and the vehicle has to be pulled up the ramp while the other two wheels are lifted by the tow truck. Since two of the wheels are on the ground and the other two wheels that are lifted cannot rotate, the drivetrain of the vehicle may be damaged. Using a flatbed tow truck may also not be practical as the vehicle placed on top of the flatbed tow truck may not clear the ramp.

The present embodiments, as described in detail below, solve the above-mentioned problems by providing wheel retainers that include one or more rollers. The vehicle's wheels that are to be lifted may be placed between two wheel retainers with rollers. When there is a need to lift only two wheels of an all-wheel drive vehicle from the ground and place the other two wheels on the ground and allow them to rotate, the two wheels that are lifted may also rotate over the rollers. The rollers, therefore, prevent damage to the drivetrain of the all-wheel drive vehicle when the vehicle has to be towed over a distance with two of the wheels on the ground.

The remaining detailed description describes the present embodiments with reference to the drawings. In the drawings, reference numbers label elements of the present embodiments. These reference numbers are reproduced below in connection with the discussion of the corresponding drawing features.

Some embodiments provide a tow truck with two hydraulic wheel lift assemblies. The first hydraulic wheel lift assembly may be used as a traditional hydraulic wheel lift to lift the two wheels of a vehicle that are closer to the tow truck. The second hydraulic wheel lift assembly may then extend below the first hydraulic wheel lift to reach the other two wheels of the vehicle that are farther from the tow truck.

Figure 1B:
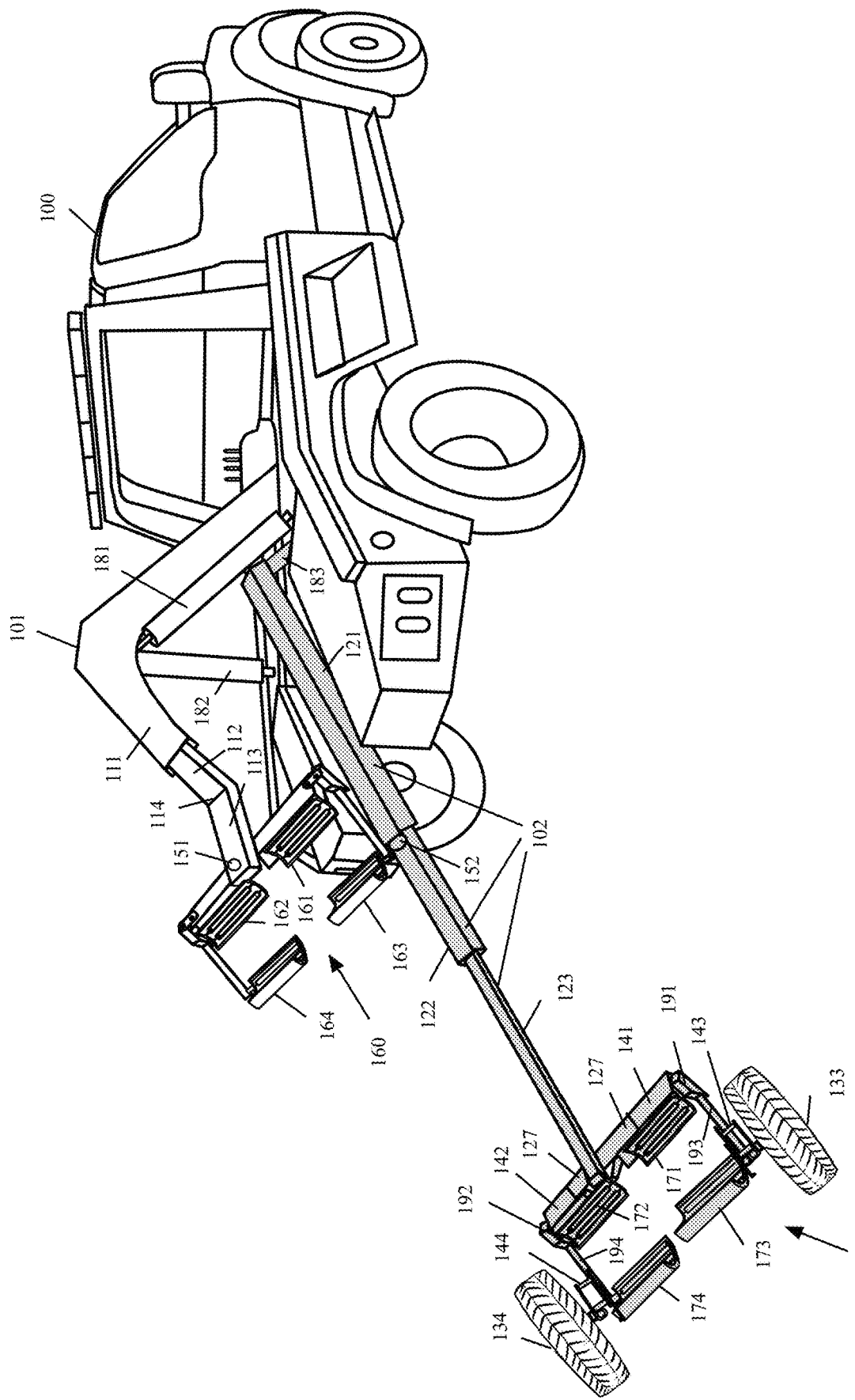

FIGS. 1A-1B are side perspective views of a tow truck with a first hydraulic wheel lift assembly for lifting a first pair of wheels of a vehicle and a second hydraulic wheel lift assembly for attaching the other pair of wheels of the vehicle to towing wheels, according to various aspects of the present disclosure. The tow truck 100, also referred to as a wrecker or a recovery vehicle, may be used to tow vehicles that are involved in the accidents, impounded, disabled, etc.

With reference to FIGS. 1A-1B, the tow truck 100 may include a wheel lift apparatus that include two hydraulic wheel lift assemblies (also referred to herein as hydraulic wheel lifts) 101 and 102. The hydraulic wheel lift assembly refers to a wheel lift assembly that includes one or more hydraulically operated components that move through the force of liquid pressure.

The hydraulic wheel lift assembly 101 may be used to lift the two wheels of a vehicle that are closer to the tow truck 100. The hydraulic wheel lift assembly 102 may extend and retract below the first hydraulic wheel lift assembly 101. The hydraulic wheel lift assembly 102 may be used to attach to towing wheels 133 and 134 (FIG. 1B) to lift the two wheels of the vehicle that are farther from the tow truck 100. The two hydraulic wheel lift assemblies 101 and 102 may be separate from each other. The two hydraulic wheel lift assemblies 101 and 102 may move independent of each other.

In this specification, the term wheel refers to a circular object made of a material, such as, metal or carbon fiber that includes a rim and a disk. The tire is a ring-shaped rubber object that is fastened around the rim of the wheel. The disk is used to connect the wheel to the vehicle's axel hub. For simplicity, the term wheel is used when describing the towing operation. It should be noted that, unless the tire of the vehicle being towed is removed or is destroyed in an accident, the rim of a wheel is typically covered by a tire.

Figure 1C:
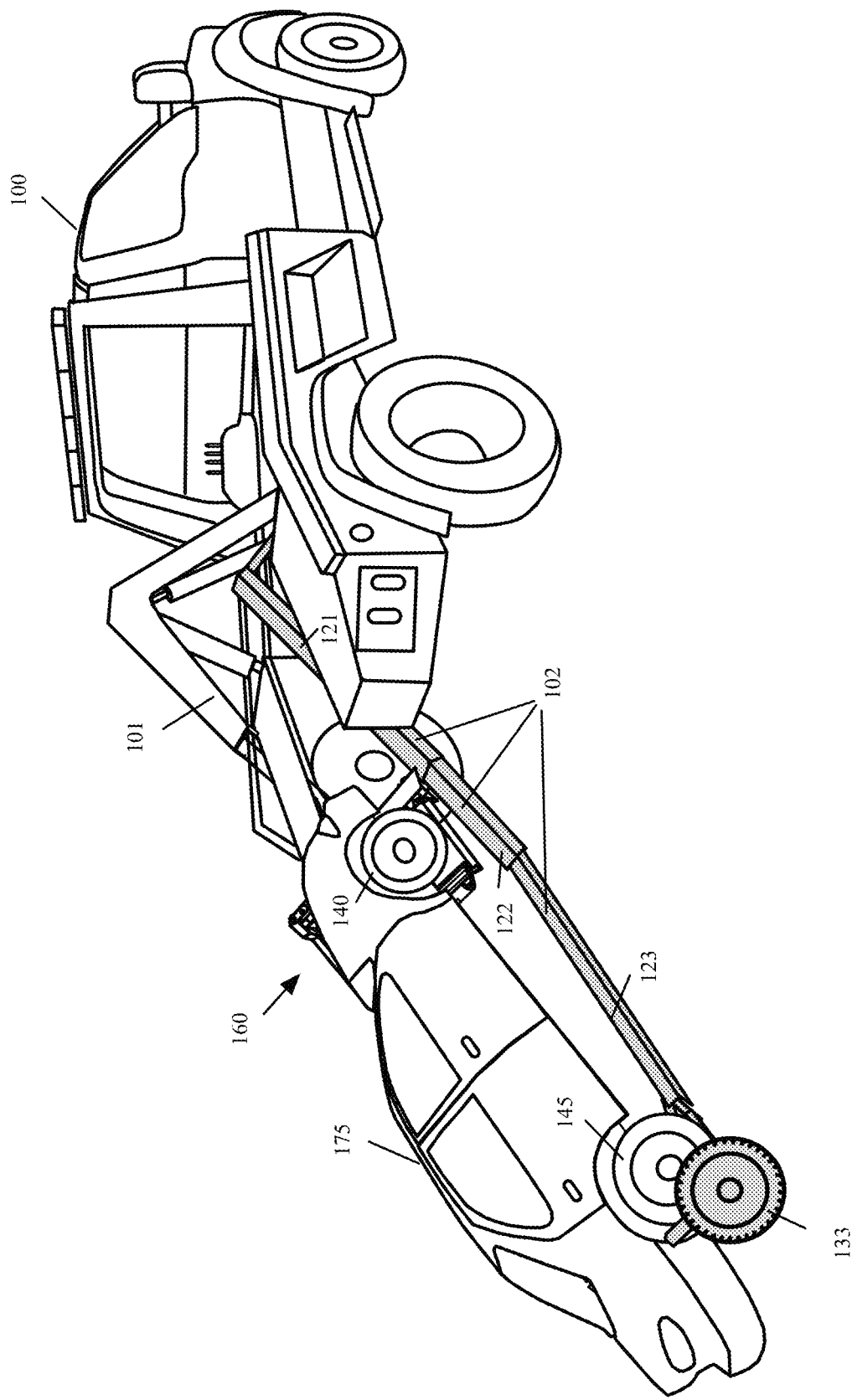
FIG. 1C is a side perspective view of the tow truck of FIGS. 1A-1B where the two hydraulic wheel lift assemblies are used to tow a vehicle, according to various aspects of the present disclosure.

FIG. 1C is a side perspective view of the tow truck 100 of FIGS. 1A-1B where the two hydraulic wheel lift assemblies are used to tow a vehicle, according to various aspects of the present disclosure. As shown in FIG. 1C, the hydraulic wheel lift assembly 101 is used to lift the first pair of wheels 140 of the vehicle 175 that are closer to the truck 100 (in this example the front wheels). The hydraulic wheel lift assembly 102 is used to lift the second pair of wheels 145 of the vehicle 175 that are farther from the truck 100 (in this example the back wheels). In the side perspective view of FIG. 1C, only one of each wheels 133, 140, and 145 is shown.

In order to keep the second pair of wheels 145 of the vehicle 175 off the ground, some embodiments may attach one or two towing wheels to each side of the hydraulic wheel lift assembly 102. In the example of FIG. 1C, one towing wheel is connected to each side of the hydraulic wheel lift assembly 102. Further details of the towing wheels are described below with reference to FIGS. 7 and 10-11.

Referring back to FIGS. 1A-1B, the bed 130 on the upper back of the tow truck 100, in some embodiments, may be slanted such that the edge of the bed 130 that is closer to the back of the truck 100 is lower than the edge that is farther from the back of the truck 100. The bed 130 of the truck 100 may include a recess (or cavity) 135. The hydraulic wheel lift assembly 102, in some embodiments, such as the embodiment depicted in FIGS. 1A-1B, may at least be partially located inside the recess 135.

FIG. 1A shows the hydraulic wheel lift assembly 101 being extended before the first pair 140 of the vehicle 175 (FIG. 1C) is lifted from the ground. The vehicle 175 (FIG. 1C) being lifted is not shown in FIGS. 1A-1B to prevent the image of the vehicle 175 from blocking the details of the wheel lift assemblies 101 and 102. The hydraulic wheel lift assembly 102 in FIG. 1A is shown to be stowed inside the recess 135. FIG. 1B shows the hydraulic wheel lift 101 in a position where the first pair of the wheels 140 of the vehicle 175 (FIG. 1C) are lifted from the ground. The hydraulic wheel lift assembly 102 in FIG. 1B is shown being extended to reach the second pairs of wheels 145 of the vehicle 175 (FIG. 1C).

With continued reference to FIGS. 1A-1B, the hydraulic wheel lift assembly 101 may include several beams 111-113. The two hydraulic cylinders 181-182 may be configured to move the hydraulic wheel lift assembly 101, including the beams 111-113, up, down, forward, backward, and sideways. Other embodiments may include fewer or more than two hydraulic cylinders for moving the hydraulic wheel lift assembly 101. A hydraulic cylinder may get its power from pressurized hydraulic fluid, which is typically oil. The hydraulic cylinder may include a barrel, in which a piston may move back and forth.

The beams 111-113, in some embodiments, may have portions with substantially rectangular cross sections. At least some of the beams, such as the beam 111 may be hollow to facilitate a telescopic movement. In the example of FIGS. 1A-1B, the beams 111 and 112 are telescopic, with the beam 112 having a smaller cross section than the beam 111 to allow the beam 112 to telescopically move in and out of the hollow interior of the beam 111.

The hydraulic wheel lift assembly 101, in some embodiments, may include a hinge (or movable joint) 114 between the beams 112 and 113 to allow the beams 112 and 113 to move at an angle and tilt against each other. In the example of FIGS. 1A-1B, the hydraulic wheel lift assembly 101 is shown to include three beams 111-113, where the beam 112 may telescopically move in and out of the beam 111 and the beam 113 may rotate around the hinge 114 against the beam 112. In other embodiments, the hydraulic wheel lift assembly 101 may include fewer or more than three beams, may include more than two telescopic arms, may include more than two arms with hinges between them, may include no telescopic arms, and/or may include no hinges between the arms.

The hydraulic cylinder 183 may be configured to move the hydraulic arm assembly 102 up, down, forward, and backward. Other embodiments may include no external hydraulic cylinders or may include more than one hydraulic cylinders for moving the hydraulic wheel lift assembly 102. The hydraulic wheel lift assembly 102 may include several beams 121-123. The beams 121-122, in some embodiments, may have substantially rectangular cross sections. At least some of the beams, such as the beams 121-122 may be hollow to facilitate telescopic movements.

In the example of FIGS. 1A-1B, the hydraulic wheel lift assembly 102 is shown to include three telescoping beams 121-123. In other embodiments, the hydraulic wheel lift assembly 102 may include fewer or more than three telescopic beams. In some embodiments, the hydraulic wheel lift assembly 102 may include beams with hinges between them (e.g., similar to the beams 112-113 and the hinge 114 of the first hydraulic wheel lift assembly 101) to facilitate rotating movement of the beams against each other.

The beam 113 of the first hydraulic wheel lift assembly 101 may be attached to the cross bar 117 by the pivot 151. The pivot 151 may allow the cross bar 117 to rotate against the beam 113 when then tow truck 100 turns during towing operations. The hydraulic wheel lift 102 assembly, in some embodiments, may also include a pivot 152 (FIG. 1), which may be configured to be in a substantially same vertical plane as the pivot 150, when both wheel lift assemblies 101 and 102 are extended during towing.

Figure 2A:
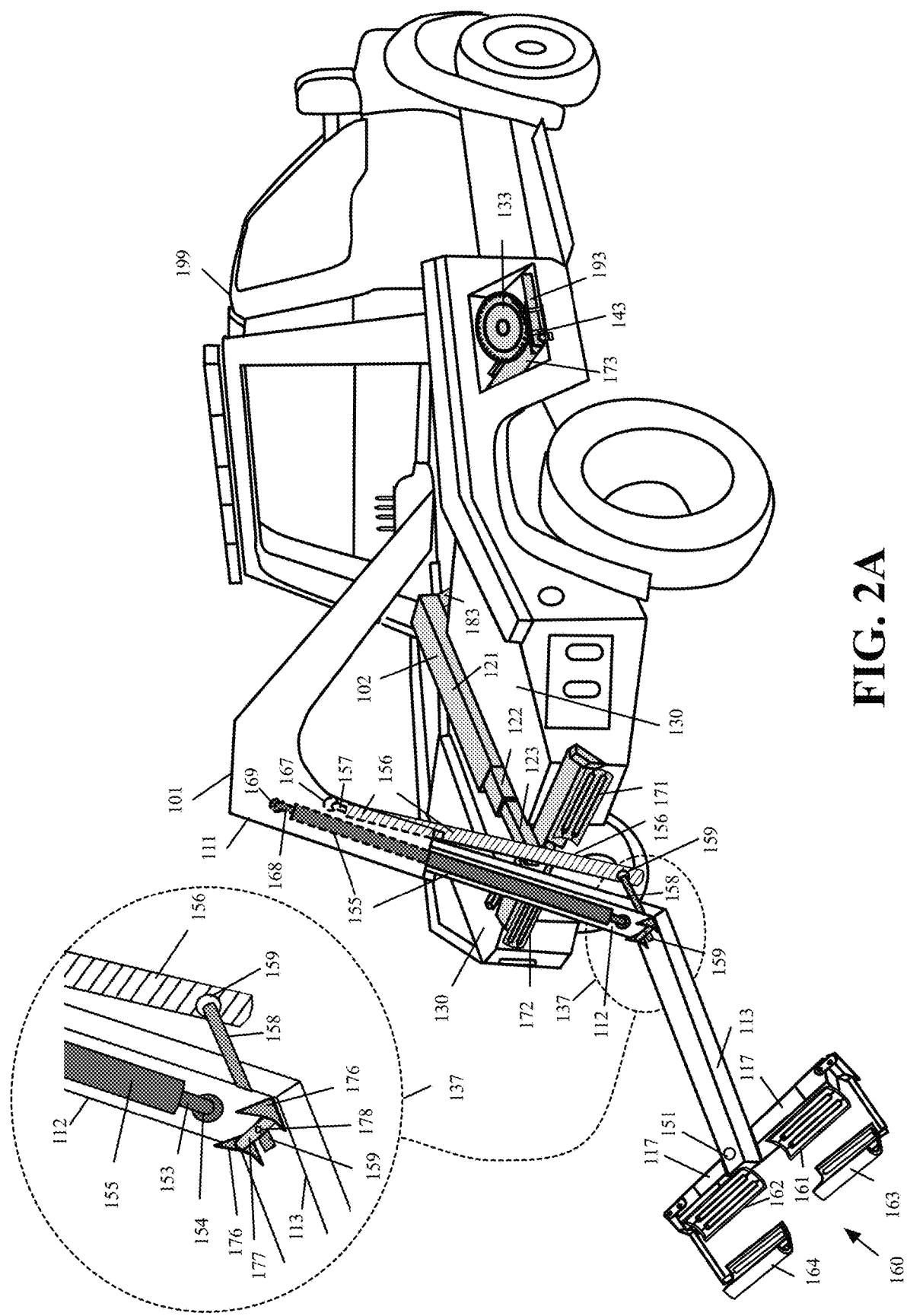
FIGS. 2A-2B are side perspective views of a tow truck similar to the tow truck of FIGS. 1A-1B, with an alternative design for the first hydraulic wheel lift assembly, according to various aspects of the present disclosure.
Figure 2B:
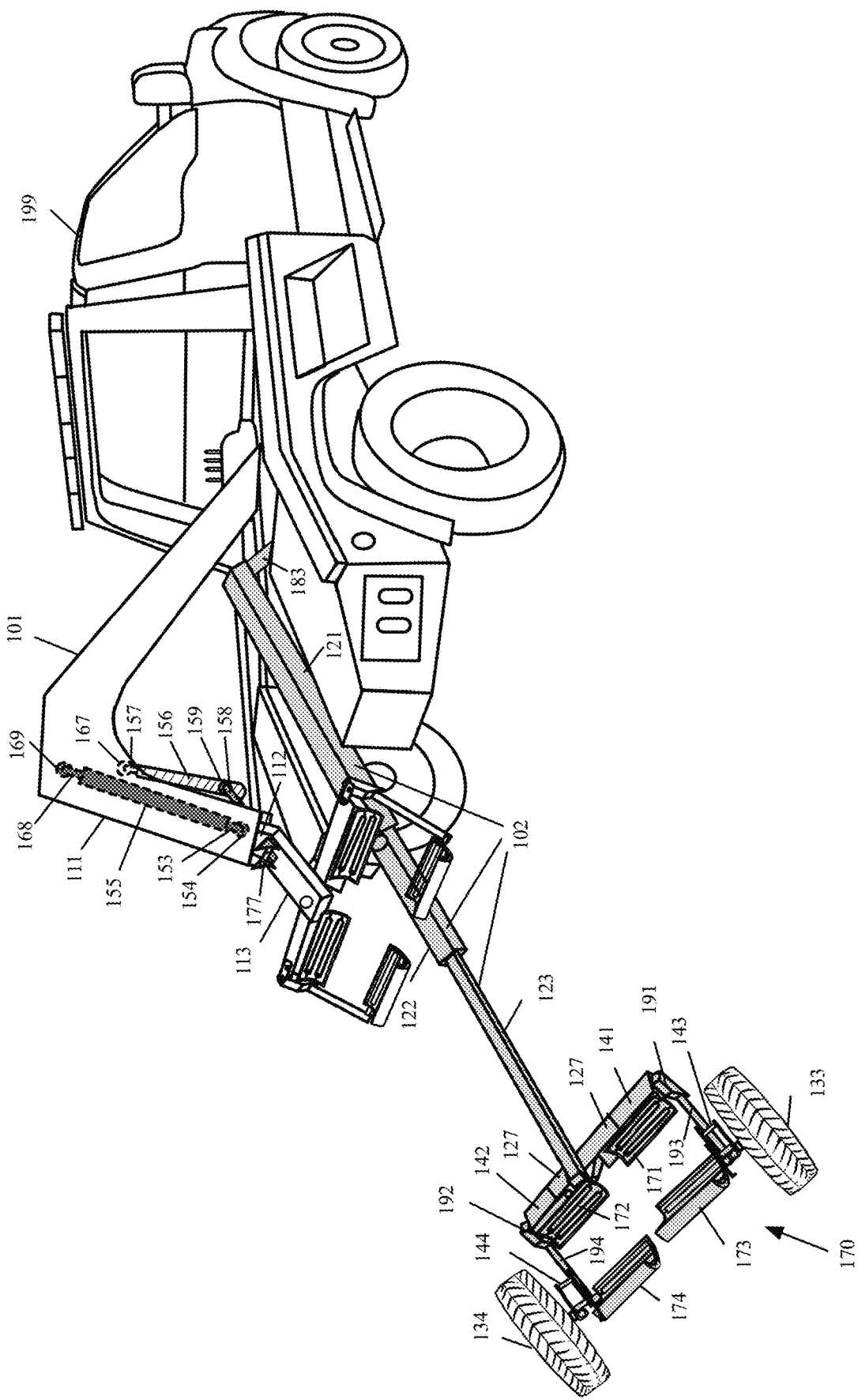

FIGS. 2A-2B are side perspective views of a tow truck similar to the tow truck of FIGS. 1A-1B, with an alternative design for the first hydraulic wheel lift, according to various aspects of the present disclosure. With reference to FIGS. 2A-2B, the tow truck 199 may be similar to the tow truck 100 of FIGS. 1A-1B, except for the hydraulic wheel lift assembly 101. In the example of FIGS. 1A-1B, the two hydraulic cylinders 181-182 may be configured to move the hydraulic wheel lift 101 assembly, including the beam 111 up, down, forward, backward, and sideways.

In contrast, the embodiment of FIGS. 2A-2B does not include the hydraulic cylinders 181-182, In these embodiments, the beam 111 is fixed. In the embodiment of FIGS. 2A-2B, the hydraulic cylinders 155 and 156 are configured to move the beams 112 and 113.

As shown in the expanded view 137, the hydraulic cylinder 155 may be connected to the beam 112 by the rod 153 and the joint 154. The hydraulic cylinder 155 may also be connected to the interior of the beam 111 by the rod 168 and the joint 169. The hydraulic cylinder 155 may be configured such that the rod 153 and the joint 154 may move towards the joint 169 in order to pull the beam 112 inside the hollow interior of the beam 111. The hydraulic cylinder 155 may be configured such that the rod 153 and the joint 154 may move away from the joint 169 in order to pull the beam 112 out of the hollow interior of the beam 111.

As shown in the expanded view 137, the hydraulic cylinder 156 may be connected to the beam 113 by the rod 158, the joints 159 and 178, and the pivot rod 177. The pivot rod 177 may be connected to the brackets 167. The hydraulic cylinder 156 may be connected to the interior of the beam 111 by the rod 157 and the joint 167. The hydraulic cylinder 156 may be configured such that the joint 159 may move towards the joint 167 in order to rotate the beam 113 around the pivot rod 177 towards the ground. The hydraulic cylinder 156 may be configured such that the joint 159 may move away from the joint 167 in order to rotate the beam 113 around the pivot rod 177 away from the ground. Other components of the truck 199 of FIGS. 2A-2B may be similar to the corresponding components of the truck 100 of FIGS. 1A-1B.

With further reference to FIGS. 1A-1B, the hydraulic wheel lift assemblies 101 and 102 may include the wheel retainer structures 160 and 170, respectively. The wheel retainer structures 160 and 170 may include the wheel retainers 161-164 and 171-173, respectively, for supporting the wheels of the vehicle being towed. The wheel retainer structure 170 may include the rods 193 and 194 (FIG. 1B) that may be inserted into the brackets 191 and 192, respectively. The rods 193 and 194 may include shafts that may be to attach to the towing wheels 133 and 134. In some embodiments, the wheel retainer structure 170 may include the spindles 143-144 to lift up the rods 193-194, respectively. In other embodiments, the rods 193-194 may be lifted by a jack to attach to the towing wheels 133-134, respectively. Further details of the wheel retainer structures used in the present embodiments are described with reference to FIGS. 3-7, 10-11, and 13-15.

Figure 3:
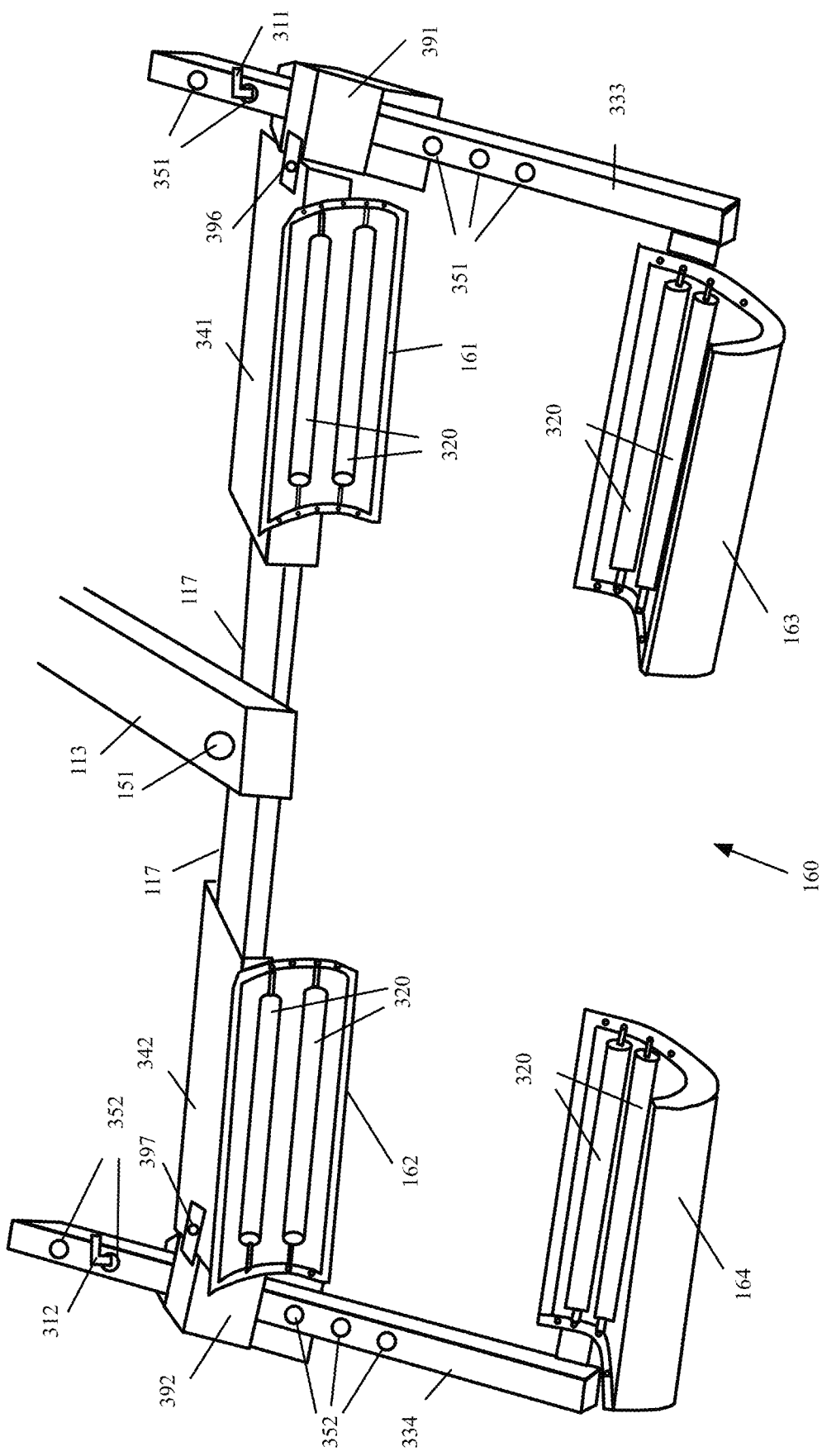
FIG. 3 is a top perspective view of the wheel retainer structure of the first hydraulic wheel lift of a tow truck, according to various aspects of the present disclosure.

FIG. 3 is a top perspective view of the wheel retainer structure of the first hydraulic wheel lift assembly 101 of a tow truck, according to various aspects of the present disclosure. With reference to FIG. 3, the wheel retainer structure 160 may include the cross bar 117, the bars 341-342, the brackets 391-392, the pivots 396-397, the wheel retainers 161-164, the rods 333-334, and the pins 311-312.

The bars 341-342 may be configured to make telescopic movements against the cross bar 117 in order to adjust the width of the wheel retainer structure 160 to fit the width of different types of vehicles that are being towed. The cross bar 117 and the bars 341 and 342, in some embodiments, may have a substantially rectangular cross section. In the depicted embodiment, the cross bar 117 may have a smaller cross section that the bars 341-342 in order for the cross bar 117 to telescopically move in and out of the bars 341-342.

In other embodiments, the bars 341-342 may have a smaller cross section than the cross bar 117 in order for the bars 341-342 to telescopically move in and out of the cross bar 117.

In some embodiments, the bars 341-342 may be fixedly connected to the wheel retainers 161 and 162, respectively. The brackets 391-392, in some embodiments, may be connected to the bars 341-342 by the pivots 396-397, respectively. The brackets 391-392 may be used to hold the rods 333 and 334, respectively. The pivots 396-397 may allow the brackets 391-392 to rotate against the bars 341-342, respectively in order to adjust the angels of the rods 333 and 334 (e.g., when one or both tires of the vehicle being towed is off alignment) or to allow the bars 343-344 to rotate against the bars 341-342, respectively, when the tow truck makes turns during the towing operation.

The rods 333 and 334 may be fixedly attached to the wheel retainers 163 and 164, respectively. The rod 333 may be moved through the bracket 391 in order to adjust the distance between the wheel retainers 161 and 163 to fit different sizes of the wheels of the vehicles being towed. The bar 334 may be moved through the bracket 392 in order to adjust the distance between the wheel retainers 162 and 164. Each of the brackets 391-392 may include two openings for allowing the corresponding rods 333 and 334 to go through. The openings that face the wheel retainers 163 and 164 may be configured to be wider than the opposite openings in order to allow the rods 363-334 and the wheels retainers 163-164 to move up and down by several inches during towing.

The rods 333 and 334 may include the holes 351-352, respectively. The pin 311 may be used to prevent the rod 333 from coming out of the bracket 391. The pin 312 may be used to prevent the rod 334 from coming out of the bracket 392. The rods 333-334 may be pulled out of the brackets 391-392, respectively, for example, and without limitations, when the tow truck is not being used to tow a vehicle.

Figure 4:
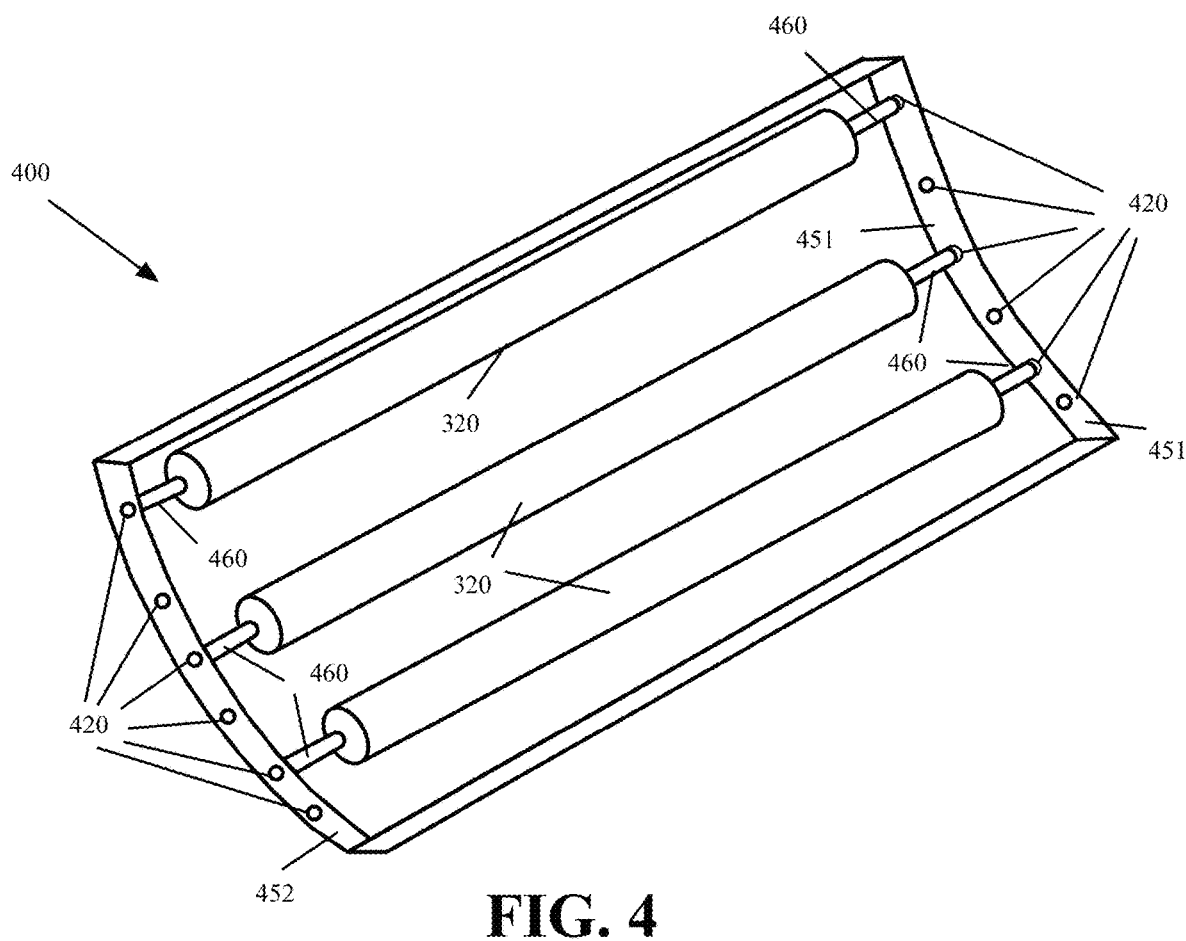
FIG. 4 is a front perspective view of a wheel retainer that includes a set of rollers, according to various aspects of the present disclosure.
Figure 5:
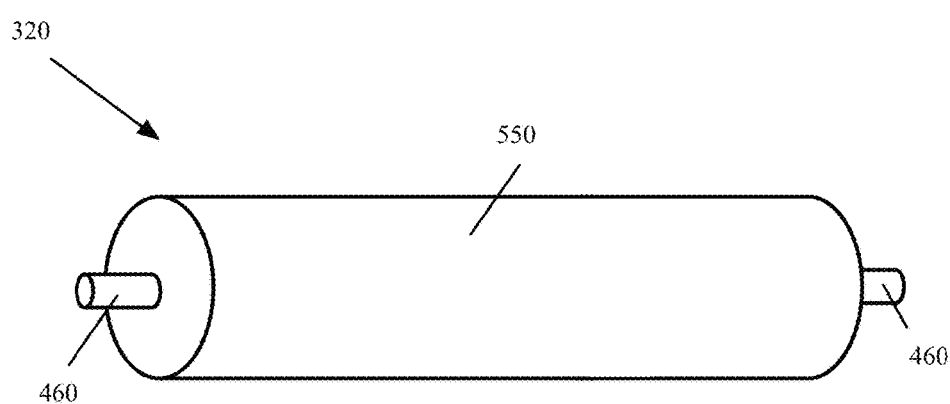
FIG. 5 is a front perspective view of a wheel retainer's roller, according to various aspects of the present disclosure.

The wheel retainers 161-164, in some embodiments, may include a set of rollers 320 to allow the wheels of the vehicle being towed to rotate in place when the other two wheels of the vehicle are on the ground. FIG. 4 is a front perspective view of a wheel retainer 400 that includes a set of rollers 320, according to various aspects of the present disclosure. FIG. 5 is a front perspective view of a wheel retainer's roller 320, according to various aspects of the present disclosure.

With reference to FIG. 4, the wheel retainer 400 may be any of the wheel retainers 161-164 and 171-174 of FIGS. 1A-1B, 3, and 7. The wheel retainer 400 may include one or more rollers 320. The wheel retainer 400, in some embodiments, may include several holes 420 on each side 451 and 452 for inserting rollers in the wheel retainer 400. With reference to FIGS. 4 and 5, the rollers 320 may include two rods 460 at each side of the roller 320 to insert the roller 320 into a pair of the holes 420 on the opposite ends of the wheel retainer 400.

The rollers' body 550 may be made, at least partly, of a durable material such as, for example, and without limitations, metal, rubber, carbon fiber, graphite, etc. The rollers 320 may be added to, or removed from, the wheel retainer 400 to fit a particular towing task. The wheel retainer 400 may have a curved shape to better fit around the wheel of a vehicle being towed.

Figure 6:
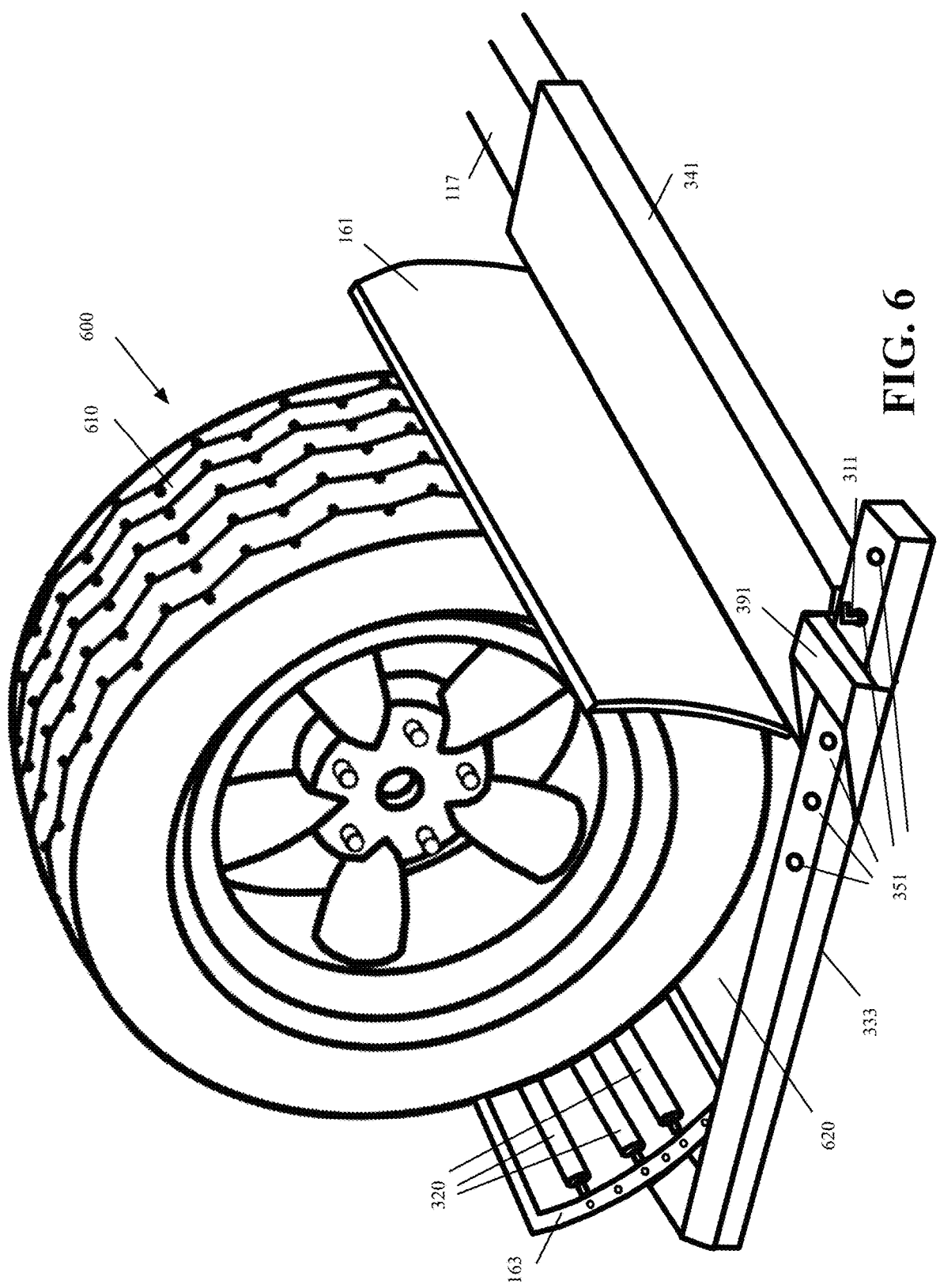
FIG. 6 is a front perspective view of a pair of wheel retainers fitted around the wheel of a vehicle being towed, according to various aspects of the present disclosure.

FIG. 6 is a front perspective view of a pair of wheel retainers fitted around the wheel 600 of a vehicle being towed, according to various aspects of the present disclosure. The example of FIG. 6 describes the pair of wheel retainers 161 and 163 of FIG. 3. The discussion is similarly applicable to the wheel retainer pairs 162 and 164, 171 and 173, and/or 172 and 174 of FIGS. 1A-1B.

With reference to FIG. 6, the wheel retainers 161 and 163 are shown while the wheel 600 of the vehicle being towed is still on the ground 620 (the rest of the vehicle being towed is not shown for clarity). The wheel retainer 161 may be placed against the tire 610 of the vehicle on the side of the tire 610 that faces the tow truck. The wheel retainer 163 may be placed against the tire 610 on the other side of the tire 610 that faces opposite the tow truck.

With further reference to FIG. 6, the distance between the wheel retainers 161 and 163 may be adjusted by taking off the pin 311 and moving the rod 333 through the bracket 391. After the distance between the wheel retainers 161 and 163 is adjusted to fit around the tire 600, the pin 311 may be placed back in one of the holes 351 to prevent the rod 333 from coming off the bracket 391.

The wheel retainers that include the rollers 320 provide the technical advantage of allowing the wheels that are being lifted to rotate in case the vehicle is all-wheel drive and the other two wheels have to be placed on the ground, at least for a period of time, during towing. The all-wheel drive vehicles are designed such that all four wheels of the vehicle must rotate together, otherwise the vehicle's drivetrain may be damaged.

In some situations, it may be necessary to tow an all-wheel drive vehicle for a distance while two of the wheels are on the ground. As an example, when the vehicle is in a subterranean parking with a steep ramp, a flatbed tow truck may not be used as the vehicle placed on top of the tow truck may not clear the ramp. Using a wheel-lift tow truck to lift two of the vehicle's wheels and placing the other two wheels on towing wheels may not be possible as the portion of the vehicle that is over the towing wheels may not clear the ramp. In these situations, the two wheels that are placed over the towing wheels have to be placed on the ground and the vehicle has to be pulled up the ramp while two of the vehicle's wheels are lifted and other two wheels are on the ground. If the wheels that are lifted cannot rotate, the drivetrain of the vehicle may be damaged.

Using the wheel retainers of the present embodiments that include rollers allows the two wheels that are lifted to rotate over the rollers at the same time that the two wheels that are on the ground rotate, without damaging the drivetrain of the vehicle. Once the vehicle is towed over the ramp, the two wheels that are on the ground may be placed back over the towing wheels. The wheel retainers of the present embodiments that include rollers may be used by the traditional tow trucks that only have one hydraulic wheel lift as well as the tow trucks of the present embodiments that include two hydraulic wheel lifts.

Figure 7:
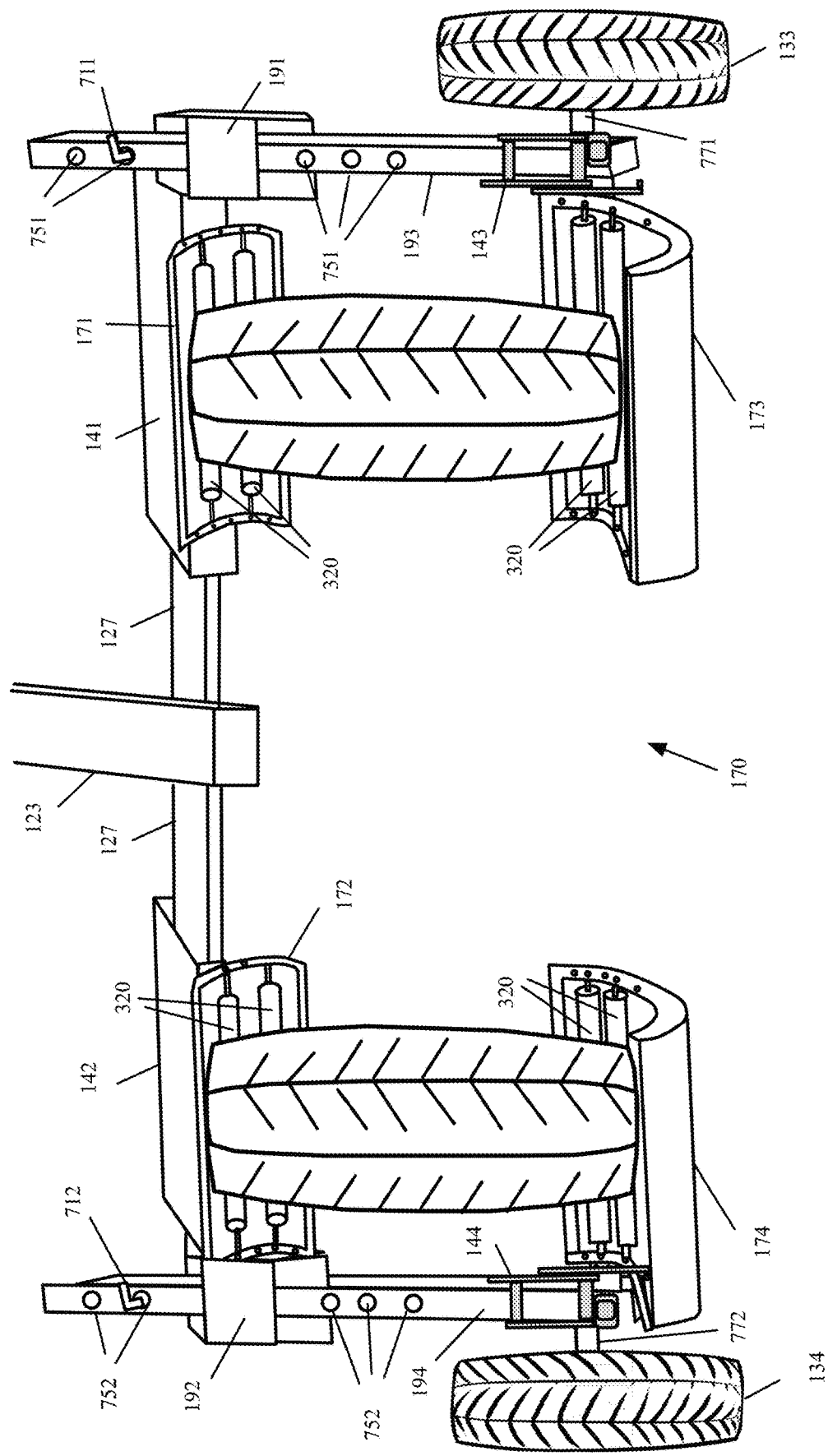
FIG. 7 is a top perspective view of the wheel retainer structure of the second hydraulic wheel lift assembly that may be used for attaching towing wheels, according to various aspects of the present disclosure.

FIG. 7 is a top perspective view of the wheel retainer structure 170 of the second hydraulic wheel lift assembly 102 that may be used for attaching towing wheels, according to various aspects of the present disclosure. With reference to FIG. 7, the wheel retainer structure 170 may include the cross bar 127, the bars 141-142, the brackets 191-192, the wheel retainers 171-174, the rods 193-194, the shafts 771-772, the pins 711-712, the spindles 143-144, and the towing wheels 133-134.

The beam 123 may be fixedly attached to the cross bar 127. The bars 141-142 may be configured to make telescopic movement against the cross bar 127 in order to adjust the width of the wheel retainer structure 170 to fit the width of different types of vehicle being towed. The cross bar 127 and the bars 141 and 142, in some embodiments, may have a substantially rectangular cross section. In the depicted embodiment, the cross bar 127 may have a smaller cross section than the bars 141-142 in order for the cross bar 127 to telescopically move in and out of the bars 141-142. In other embodiments, the bars 141-142 may have a smaller cross section than the cross bar 127 in order for the bars 141-142 to telescopically move in and out of the cross bar 127.

In some embodiments, the bars 141-142 may be fixedly attached to the wheel retainers 171 and 172, respectively. The brackets 191-192, in some embodiments, may be fixedly attached to the bars 141-142, respectively. The brackets 191-192 may be used to hold the rods 193 and 194, respectively. The rods 193 and 194 may be fixedly attached to the wheel retainers 173 and 174, respectively.

Each of the brackets 191 and 192 may include two openings for allowing the corresponding rods 193 and 194 to go through. The openings that face the wheel retainers 173 and 174 may be configured to be wider than the opposite openings in order to allow the rods 193-194 and the wheels retainers 173-174 to move up and down by several inches during towing. The rod 193 may be moved through the bracket 191 in order to adjust the distance between the wheel retainers 171 and 173 to fit different sizes of the wheels of the vehicles being towed. The rod 194 may be moved through the bracket 192 in order to adjust the distance between the wheel retainers 172 and 174

The rods 193 and 194 may include the holes 751-752, respectively. The pin 711 may be used to prevent the rod 193 from coming out of the bracket 191. The pin 712 may be used to prevent the rod 194 from coming out of the bracket 192. The rods 193-194 may be pulled out of the brackets 191-192, respectively, for example, and without limitations, when the tow truck is not being used to tow a vehicle. The rods 193-194, the wheel retainers 173-174, and/or the towing wheels 173-174 may be detached from the hydraulic wheel lift assembly 102 and stored on the bed or on the sides of the tow truck. For example, FIG. 1A shows the towing wheel 133, the rod 193, the wheel retainer 173, and the rod's attachments are stored on one side of the tow truck 100.

With further reference to FIG. 7, the wheel retainers 171-174, in some embodiments, may include a set of rollers 320, which may be similar to the roller 320, described above with reference to FIGS. 4-5. The rods 193 and 194 may include the shafts 771-772, respectively. The shafts 771-772 may be used to connect the towing wheels 133-134 to the rods 193 and 194, respectively. The shafts 771-772 may be configured such that the towing wheels 133-134 may be attached and detached to the shaft by quick release mechanisms, such as, for example, and without limitations, twist and lock mechanisms, pins and hole mechanism, etc.

The wheel retainer structure 170, in some embodiments, may include the spindles 143-144 that are connected to the rods 193 and 194, respectively. The spindles 143-144 may be used to quickly lift the rods 193 and 194 above the ground. The spindles 143-144, in some embodiments, may provide a similar functionality as the spindles of the traditional towing dollies.

Figure 8:
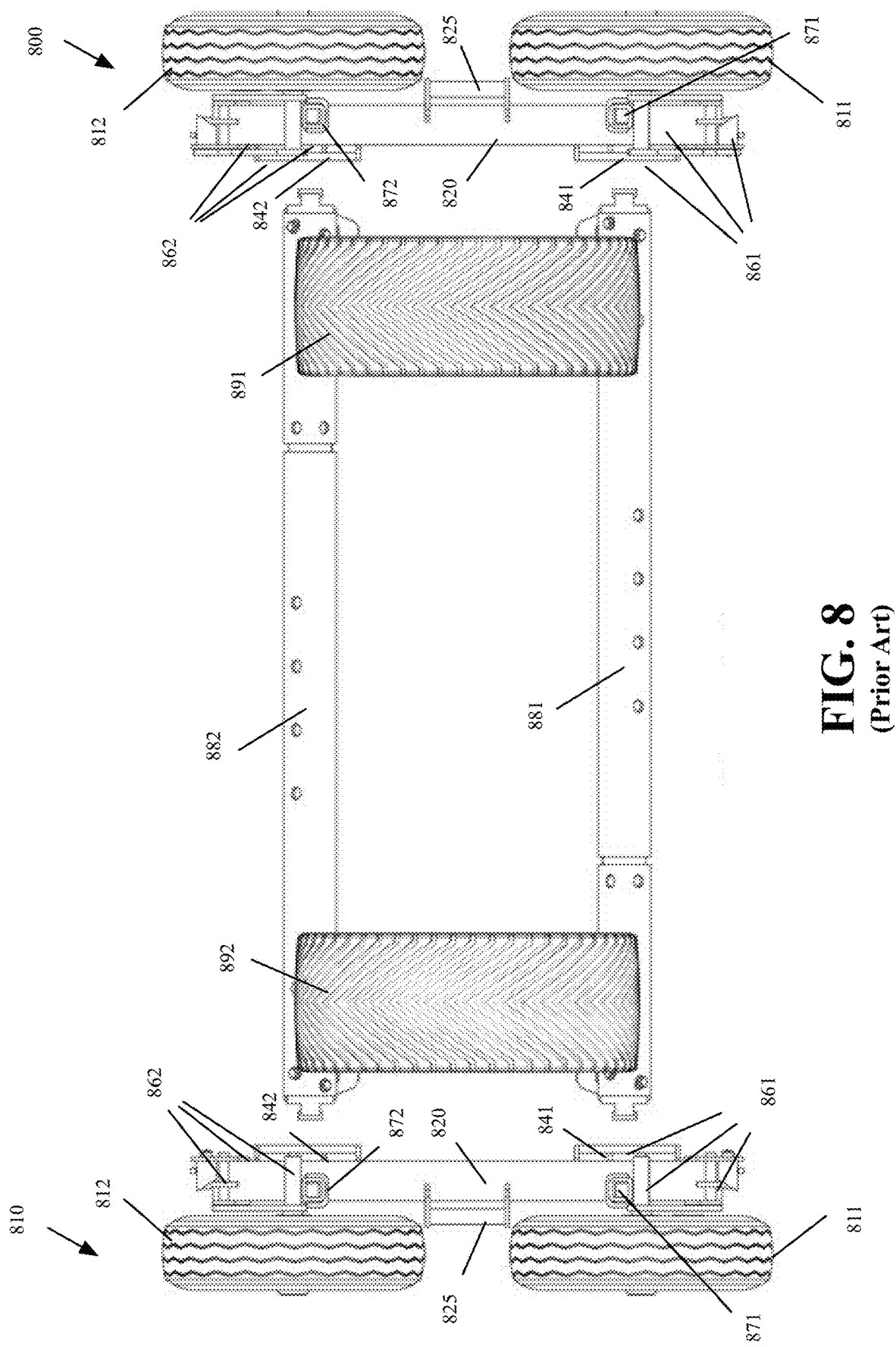
FIG. 8 is functional diagram illustrating an example use of two tow dollies for lifting a pair of wheels of a vehicle, according to prior art.

FIG. 8 is functional diagram illustrating an example use of two tow dollies for lifting a pair of wheels of a vehicle, according to prior art. The figure shows two tow dollies 800 and 810 that are placed on either sides of a vehicle to be towed. For clarity, only the two wheels 891-892 of the vehicle being towed are shown. The two wheels 891-892 are the pair of the vehicle's wheels that are farther from the tow truck. The two wheels 891-892 may be lifted by the two tow dollies 800 and 810 while the other two wheels (not shown)

of the vehicle that are closer to the tow truck may be lifted by the tow truck's hydraulic wheel lift.

Each of the two tow dollies 800 and 810 may include two wheels 811-812, a frame 820, a handle 825, two axel cradles 841-842, and two spindles 861-862. To prepare the vehicle for towing, the two tow dollies 800 and 810 have to be picked up (e.g., by the corresponding handles 825) from the tow truck and placed on either sides of the vehicle. The two axels 881-882 have also to be picked up from the tow truck and placed under the vehicle to touch the two wheels 891-892. For each tow dolly 800 and 810, the two axels 881-882 have to be engaged into the two axel cradles 841-842, respectively, to lift up the wheels 891-892. Each spindle 861-862 may include an anchor 871-872, respectively. The anchors 871-872 may be used for placing a lever to lift the corresponding side of the tow dolly, as described below with reference to FIG. 9.

Figure 9:
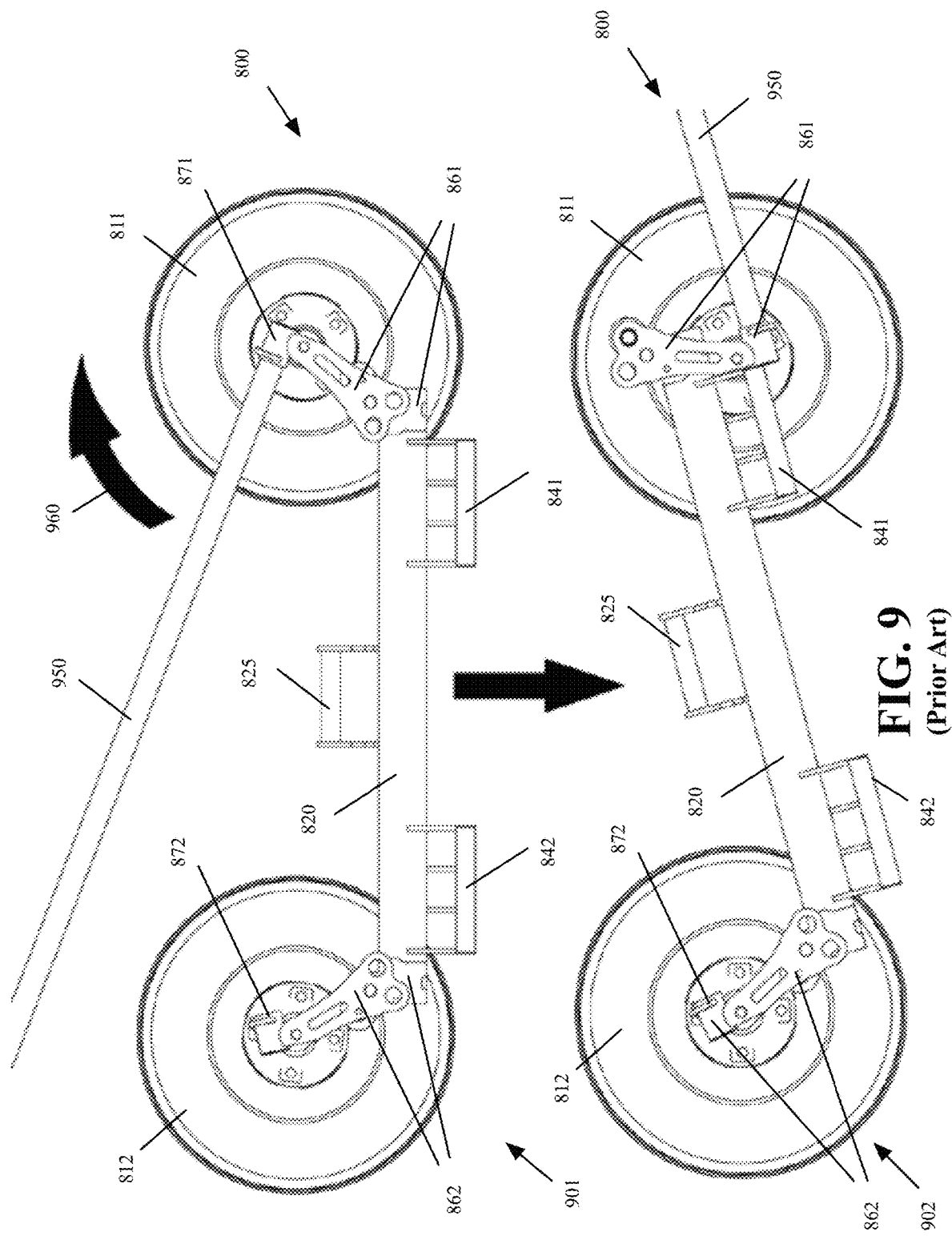
FIG. 9 is functional diagram illustrating the operation of the tow dolly of FIG. 8, according to prior art.

FIG. 9 is functional diagram illustrating the operation of the tow dolly 800 of FIG. 8, according to prior art. The figure, as shown, includes two operational stages 901-902. In stage 901, the two axel cradles 841-842 may be placed on the ground. One side of each axel 881-882 (FIG. 8) may be inserted into the axel cradles 841-842, respectively. The lever 950 may then be inserted into the anchor 871 of the spindle 861 and may be rotated in the direction of the arrow 960.

As shown in stage 902, as the lever 950 is rotated, the axel cradle 841 and the side of the frame 820 that is connected to the spindle 861, may be lifted off the ground. The same operation may be repeated by inserting the lever 950 into the anchor 872 of the spindle 862 and rotating the lever 950 in the opposite direction of the arrow 960 to lift the axel cradle 842 and the side of the frame 820 that is connected to the spindle 862 off the ground.

When the axels 881-882 (FIG. 8) are inserted into the axel cradles 841-842, lifting the axel cradles 841-842 and the frame 820 of the dolly 800 may cause the wheel 891 (FIG. 8) of the vehicle being towed to be lifted off the ground. The same operation may be repeated for the dolly 810 of FIG. 8 to lift the wheel 892 off the ground.

Setting up the prior art tow dollies of FIGS. 8-9 to lift the wheels of a vehicle may be time consuming. The setting up may require placing the two axels 881-882 underneath the vehicle on each side of the pair of wheels 891-892 that are going to be lifted up by the tow dollies (which are the pair of wheels that are farther from the tow truck during towing). The axels 881-882 then have to be extended to span the width of the vehicle. Each of the tow dollies 800 and 810 has to be connected to each side of the axels. The tow dollies then have to be secured by passing ratchet straps behind the vehicle's wheels and attaching the hook ends of the straps to the tow dollies. A lever is then used to rotate the spindles and lift of the wheels, as described above with reference to FIGS. 8-9.

In addition to the time consuming setup, the tow dollies and the axels are heavy. For example, each tow dolly may weight more than 50 pounds. Each time a vehicle is being towed, the tow truck driver has to pick up the two tow dollies and the two axels. The tow dollies have to be placed on each side of the car and have to be connected to each other by the two axels that extended below the frame of the car. After the towing is done, the tow dollies and the axels have to be picked up and placed back on the tow truck. Repeatedly lifting the tow dollies and the axels from the tow truck and placing them back may cause back or other types of injuries to the tow truck driver.

Another alternative in the prior art tow trucks for lifting a vehicle's wheels that are farther from the tow truck is using a jack. The jack may be used to lift each side of the vehicle followed by putting axels underneath the vehicles wheels, and putting the towing wheels underneath the wheel (similar to the setup of FIG. 8, except a jack is used to lift the wheels). Using a jack may be even for time consuming that using the tow dollies. The jack, the axels, and towing wheels may be heavy and repeated use of them may also result in injuries to the tow truck personnel.

Referring back to FIG. 1B, the tow trucks of the present embodiments solve the above-mentioned problems of the prior art tow trucks, tow dollies, and/or jacks by providing the second hydraulic lift assembly 102 that eliminates the need for the above-mentioned axels, tow dollies, and/or jacks. The first hydraulic wheel lift assembly 101 may be used as a traditional hydraulic wheel lift assembly 101 to lift the two wheels of a vehicle that are closer to the tow truck. The second hydraulic wheel lift assembly 102 may then extend below the first hydraulic wheel lift assembly 101 (e.g., as shown in FIG. 1C) to reach the two wheels of the vehicle 175 that are farther from the tow truck 100.

With further reference to FIG. 1B, the crossbar 127 and the bars 141-142 eliminate the need for the prior art axels 881-882 of FIG. 8. The crossbar 127, the bars 141-142, and the wheel retainers 171-172 are fixedly attached to the second hydraulic wheel lift 102 and the tow truck driver does not have to lift them up and attach them to the second hydraulic wheel lift 102. The driver of the tow truck 100 of the present embodiments only has to insert the rod 193 (and the attached spindle 143 and the wheel retainer 173) into the bracket 191, to insert the rod 194 (and the attached spindle 144 and the wheel retainer 174) into the bracket 192, and then attach the towing wheels 133 and 134 to the rods 193-194, respectively.

Figure 10:
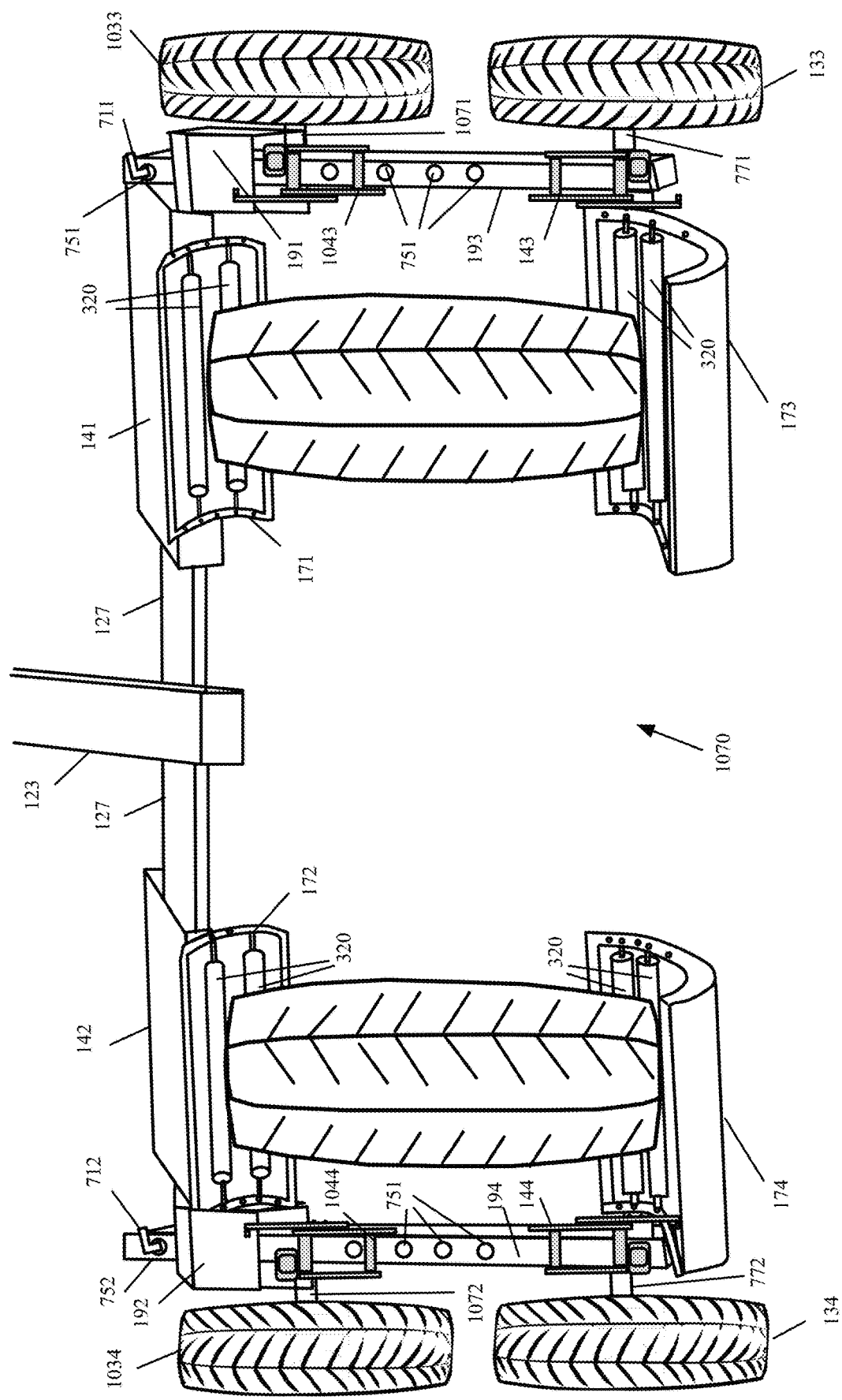
FIG. 10 is a top perspective view of the wheel retainer structure of the second hydraulic wheel lift assembly with two towing wheels on each side of the wheel retainer structure, according to various aspects of the present disclosure.

In some embodiments, the wheel retainer structure of the second hydraulic wheel lift may include two towing wheels on each side. FIG. 10 is a top perspective view of the wheel retainer structure of the second hydraulic wheel lift assembly with two towing wheels on each side of the wheel retainer structure, according to various aspects of the present disclosure. With reference to FIG. 10, the wheel retainer structure 1070 may include the cross bar 127, the bars 141-142, the brackets 191-192, the wheel retainers 171-174, the rods 193-194, the shafts 771-772, the pins 711-712, the spindles 143-144, and the towing wheels 133-134, which may provide similar functionality as the corresponding components of FIG. 7.

In addition, the wheel retainer structure 1070 may include the spindles 1043-1044, the shafts 1071-1072, and the towing wheels 1033-1034. The shafts 1071-1072 may be used to attach the towing wheels 1033-1034 to the rods 193 and 194, respectively. The shafts 1071-1072 may be configured such that the towing wheels 1033-1034 may be attached and detached to the shaft by quick release mechanisms, such as, for example, and without limitations, twist and lock mechanisms, pins and hole mechanism, etc.

The wheel retainer structure 1070, in some embodiments, may include the spindles 1043-1044 that are connected to the rods 193 and 194. The spindles 1043-1044 may be used to quickly lift the corresponding sides of the rods 193 and 194 above the ground. The spindles 1043-1044, in some embodiments, may work similar to the spindles of the traditional towing dollies, described above with reference to FIGS. 8-9.

In some embodiments, the wheel retainer structure of the second hydraulic wheel lift may not include spindles. FIG.

Figure 11:
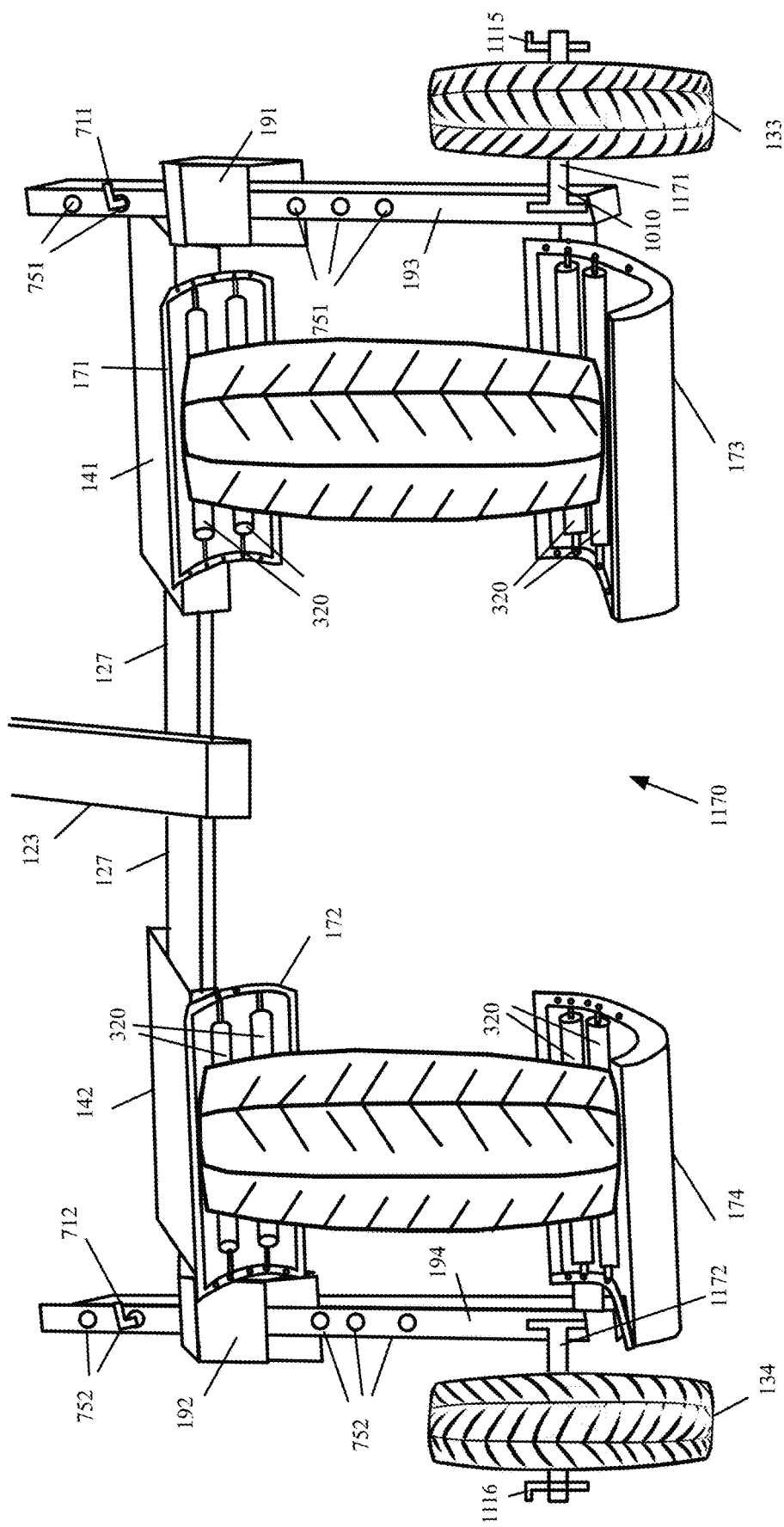
FIG. 11 is a top perspective view of the wheel retainer structure of the second hydraulic wheel lift assembly with one towing wheel on each side of the wheel retainer structure and no spindles, according to various aspects of the present disclosure.

11 is a top perspective view of the wheel retainer structure of the second hydraulic wheel lift with one towing wheel on each side of the wheel retainer structure and no spindles, according to various aspects of the present disclosure. With reference to FIG. 11, the wheel retainer structure 1170 may include the cross bar 127, the bars 141-142, the brackets 191-192, the wheel retainers 171-174, the rods 193-194, the pins 711-712, and the towing wheels 133-134, which may provide the similar functionality as the corresponding components of FIG. 7.

With reference to FIG. 11, the wheel retainer structure 1170 may not include any spindles (such as the spindles 143-144 of FIG. 7). The rods 193-194 may include the shafts 1171-1172 that may include a quick release mechanism, such as, for example, and without limitations, the pins 1115-1116, respectively. The bars 193-194 may be lifted by a jack, the wheels 133-134 may be attached to the shafts 1171-1172, and the pins 1115-1116 may be used to secure the wheels 133-134 to the shafts 1171-1172, respectively.

In the embodiment of FIGS. 1A-1B, the second hydraulic wheel lift assembly 102 has a lower height than the first hydraulic wheel lift assembly 101. The second hydraulic wheel lift assembly 102, in this embodiment, extends through the recess 135 in the bed 130 of the tow truck 100. In other embodiments, the two hydraulic wheel lifts of the tow trucks of the present embodiments may be positioned differently on the tow truck's bed and/or may have a different profiles than the embodiment of FIGS. 1A-1B.

Figure 12A:
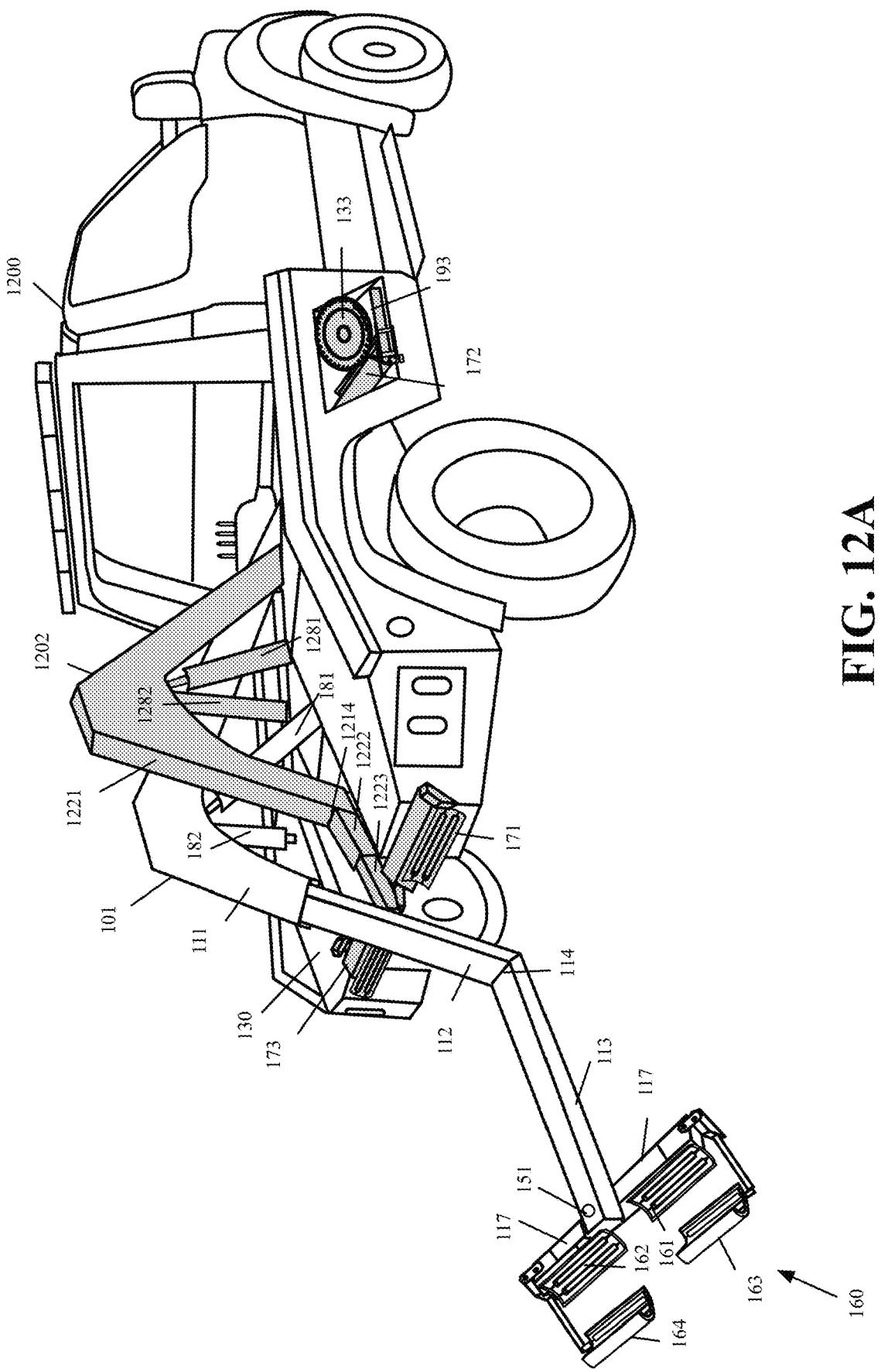
FIGS. 12A-12B are side perspective views of an alternative embodiment of a tow truck with a first hydraulic wheel lift assembly for lifting a first pair of wheels of a vehicle and a second hydraulic wheel lift assembly for attaching the second pair of wheels of the vehicle to towing wheels, according to various aspects of the present disclosure.
Figure 12B:
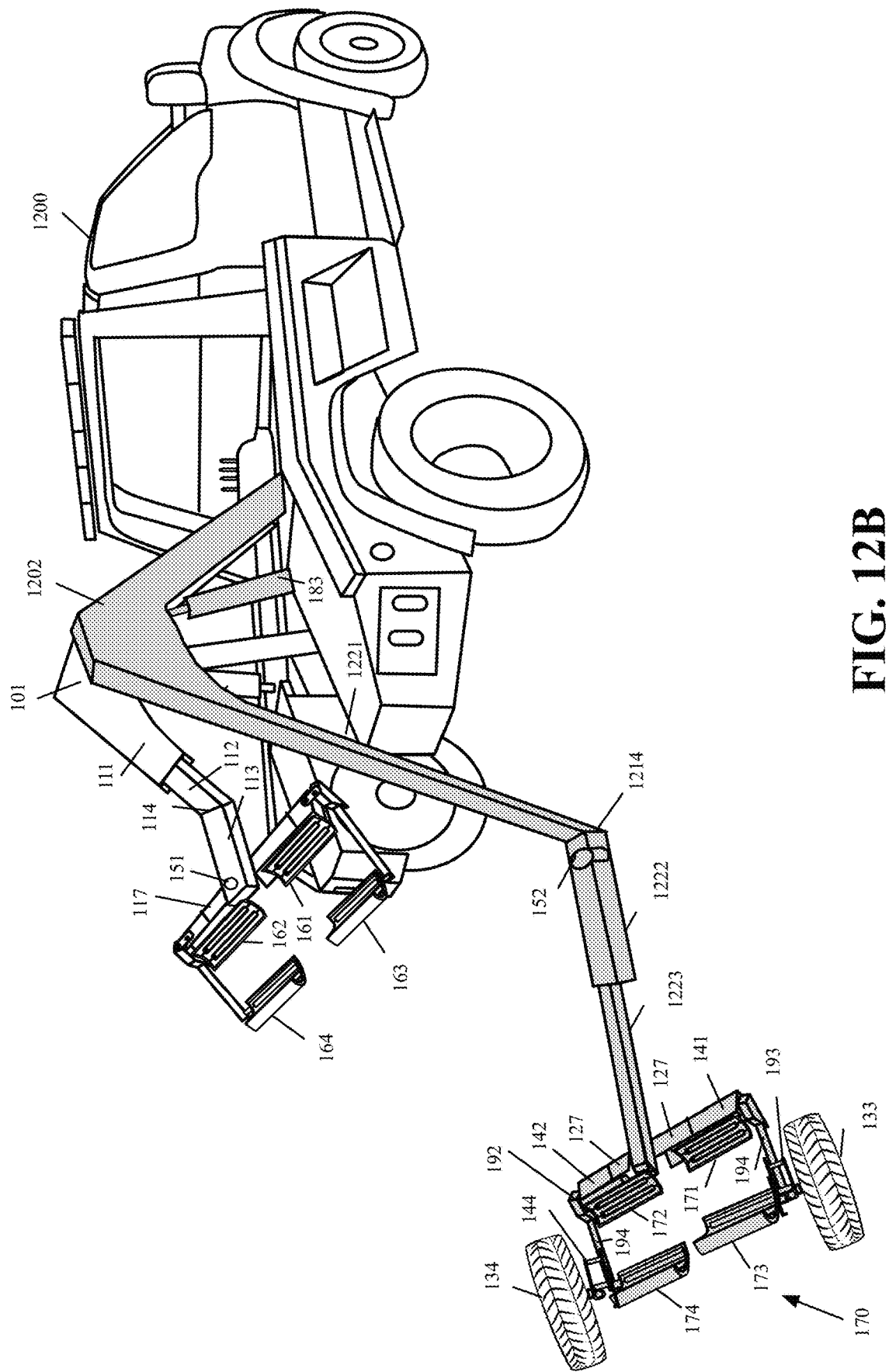

FIGS. 12A-12B are side perspective views of an alternative embodiment of a tow truck with a first hydraulic wheel lift assembly for lifting a first pair of wheels of a vehicle and a second hydraulic wheel lift assembly for attaching the second pair of wheels of the vehicle to towing wheels, according to various aspects of the present disclosure. With reference to FIGS. 12A-12B, the first hydraulic wheel lift assembly 101 may be similar to the first hydraulic wheel lift assembly 101 of FIGS. 1A-1B. The second hydraulic wheel lift assembly 1202 of FIGS. 12A-12B may extend above the bed 130 of the tow truck 1200.

The second hydraulic wheel lift assembly 1202 may have the beams 1221-1223. The two hydraulic cylinders 1281-1282 may be configured to move the second hydraulic wheel lift assembly 1202 up, down, forward, backward, and sideways. Other embodiments may include fewer or more than two hydraulic cylinders for moving the second hydraulic wheel lift assembly 1202. The hydraulic wheel lift assembly 1202 may include several beams 1221-1223. The beams 1221-1223, in some embodiments, may have substantially rectangular cross sections. At least some of the beams, such as the beam 1222 may be hollow to facilitate a telescopic movement. In the example of FIGS. 12A-12B, the beams 1222 and 1223 are telescopic, with the beam 1223 having a smaller cross section than the beam 1222.

The hydraulic wheel lift assembly 1202 may include a hinge (or movable joint) 1214 between the beams 1221 and 1222 to allow the beams 1221 and 1222 to move at an angle and tilt against each other. In the example of 12A-12B, the hydraulic wheel lift assembly 1202 is shown to include three beams 1221-1223, where the beam 1223 telescopically moves in and out of the beam 1222 and the beam 1222 may rotate around the hinge 1214 against the beam 1221. In other embodiments, the hydraulic wheel lift assembly 1202 may include fewer or more than three beams, may include more than two telescopic arms, may include more than two arms with hinges between them, may include no telescopic arms, or may include no hinges between the arms.

It should be noted that the hydraulic wheel lift assembly 101 of the truck 1200 of FIGS. 12A-12B, in some embodiments, may be similar to the hydraulic wheel lift assembly 101 of the truck 199 of FIGS. 12C-12D. For example, the hydraulic wheel lift assembly 101 of the truck 1200 may not include the hydraulic arms 181-182 and instead may include the 155 hydraulic cylinders 155 and 156 of FIGS. 2A-2B, and may operate as the hydraulic wheel lift assembly 101 of the truck 199, as described above with reference to FIGS. 2A-2B.

As described above, the rollers 320 used on the wheel retainers 161-164 provide the technical advantage of allowing the two wheels of an all-wheel vehicle that are lifted by the first hydraulic wheel lift to rotate when the other two wheels are on the ground and are rotating during towing. The rollers used on the wheel retainers 171-174 of FIGS. 7 and 10-11 provide the advantage of allowing the wheel retainers of the first hydraulic wheel lift assembly and the second hydraulic wheel lift assembly to be used interchangeably, if needed.

Despite the advantages provided by the rollers 320, the tow trucks of the present embodiments may use wheel retainers that do not include rollers. For example, some or all the wheel retainers of FIGS. 3-7 and 10-11, in some embodiments, may have the same shape as depicted in the corresponding figures without including any rollers 320.

The tow trucks of the present embodiments may also use prior art wheel retainers for one or both of the hydraulic wheel lift assemblies. For example, and without limitations, as described below, the present embodiments may use the wheel retainers 1300 (FIG. 13), 1401, 1402, 1411, 1412 (FIG. 14), 1500 (FIG. 15), 1631, 1641 (FIGS. 16A-16B), and/or 1751, 1752, 1771, 1772 (FIGS. 17A-17C) and still provide the technical advantage of having two hydraulic lifts to facilitate towing vehicles, as described herein. Several examples of prior art wheels retainers that may be used in the tow trucks of the present embodiments are described below.

Figure 13:
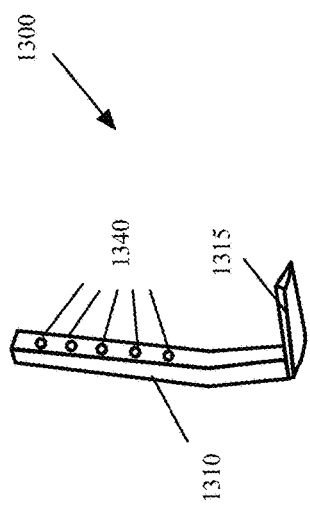
FIG. 13 illustrates a front perspective view of a tow truck wheel retainer, according to prior art.

FIG. 13 illustrates a front perspective view of a tow truck wheel retainer, according to prior art. With reference to FIG. 13, the wheel retainer 1300 may be L-shaped with an arm 1310 that may be inserted into a bracket and an arm 1315 that may hold one side of a wheel of a vehicle that is being towed. The holes 1340 may be used to insert a pin to prevent the wheel retainer 1300 to come out of a bracket, as described below with reference to FIG. 14.

Figure 14:
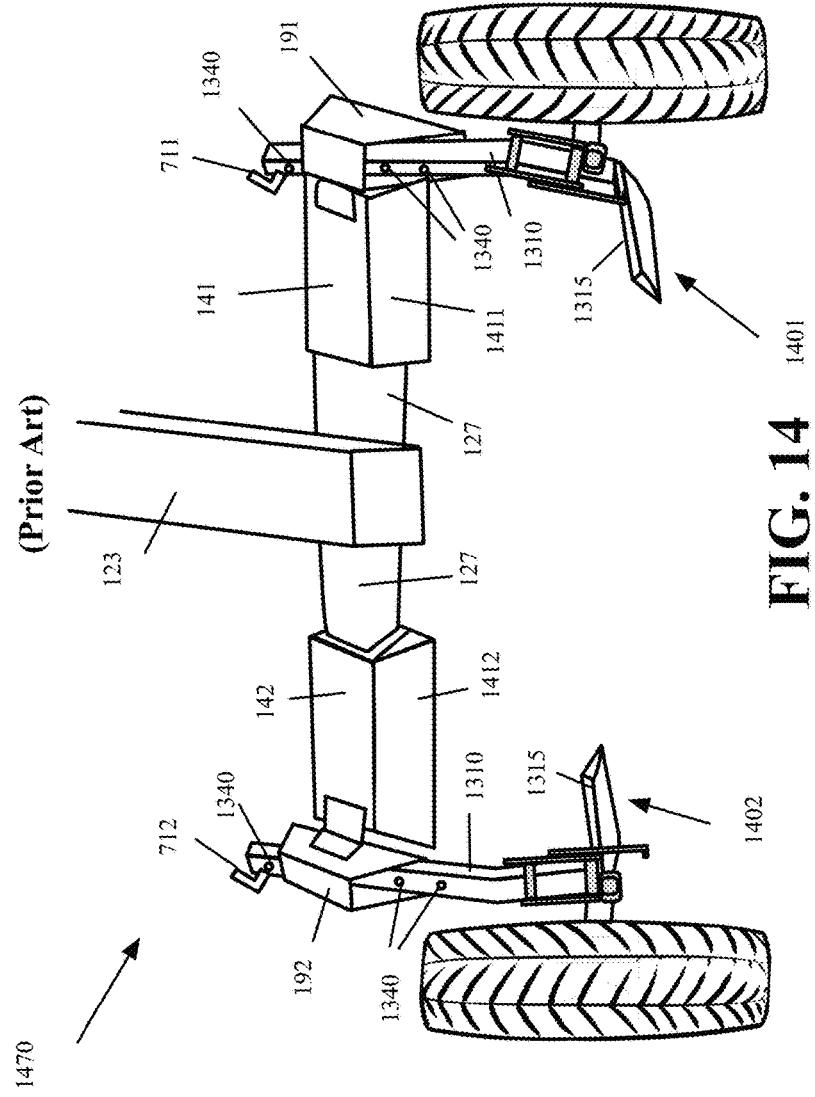
FIG. 14 illustrates a top perspective view of a tow truck wheel retainer structure, according to various aspects of the present disclosure.

FIG. 14 illustrates a top perspective view of a tow truck wheel retainer structure 1470, according to various aspects of the present disclosure. The example of FIG. 14 is described with reference to the truck wheel retainer structure of the second hydraulic lift assembly. It should be noted that a similar discussion applies to the wheel retainer structure of the first hydraulic lift assembly, except that no wheels are attached to the wheel retainers of the first hydraulic wheel lift assembly.

As shown in FIG. 14, the wheel retainer structure 1470 may include two types of wheel retainers. The L-shaped wheel retainers 1401 and 1402 and the slanted wheel retainers 1411 and 1412, with each slanted wheel retainer 1411 or 1412 being a slanted surface. Each pair of one L-shaped wheel retainer and one slanted wheel retainer (1401/1411 and 1402/1412) may be used to hold one wheel of the vehicle being towed, with the L-shaped wheel retainer in each pair contacting the side of wheel that is farther from the tow truck and the slanted wheel retainer in the pair contacting the side of the wheel that is closer to the towing truck.

The cross bar 127 may be attached to the bars 141-142. The bars 141-142, in some embodiments, may have a substantially rectangular cross section with the slanted wheel retainers 1411-1412 attached to sides of the bars 141-142 that face the wheel of the vehicle being towed. The bars 141-142 may be hollow and the cross section of the bars 141-142 may be configured such that the cross bar 127 telescopically move into and out of the bars 141-142 for adjusting the width of the wheel retainer structure 1470.

In other embodiments, the bars 141-142 may have a polygon shape cross section with slanted sides 1411-1412, respectively. The polygon cross section of the bars 141-142, in these embodiments, may be configured such that the cross bar 127 may telescopically move into and out of the bars 141-142 for adjusting the width of the wheel retainer structure 1470.

With further reference to FIG. 14, the bars 141-142 may be fixedly attached to the brackets 191-192, respectively. The L-shaped wheel retainer 1401 and 1402 may be similar to the L-shaped arm 1300 of FIG. 13. The L-shaped wheel retainer 1401 and 1402 may be inserted into the brackets 191-192, respectively. The arms 1310 of each L-shaped arms of the wheel retainer 1401 and 1402 may be moved inside the brackets 191-192, respectively to adjust to the sizes of the wheels of different vehicles being towed. The holes 1340 and the pins 711-712 may be used to prevent the L-shaped wheel retainer 1401 and 1402 to come out of the brackets 191-192, respectively.

To prepare a vehicle's wheels for lifting, the hydraulic wheel lift may be lowered such that the slanted surfaces 1411 and 1412 touch the side of wheel that is closer to the tow truck. The arm 1315 of each L-shaped wheel retainer 1401 and 1402 may then be placed on the opposite side of the wheel. The other arm 1410 of each L-shaped wheel retainer 1401 and 1402 may be inserted into the corresponding bracket 191-192. The length of the arms 1410 that go through the brackets 191-192 may be adjusted to hold a tight grip on the wheel such that the wheel may not be able to turn.

Figure 15:
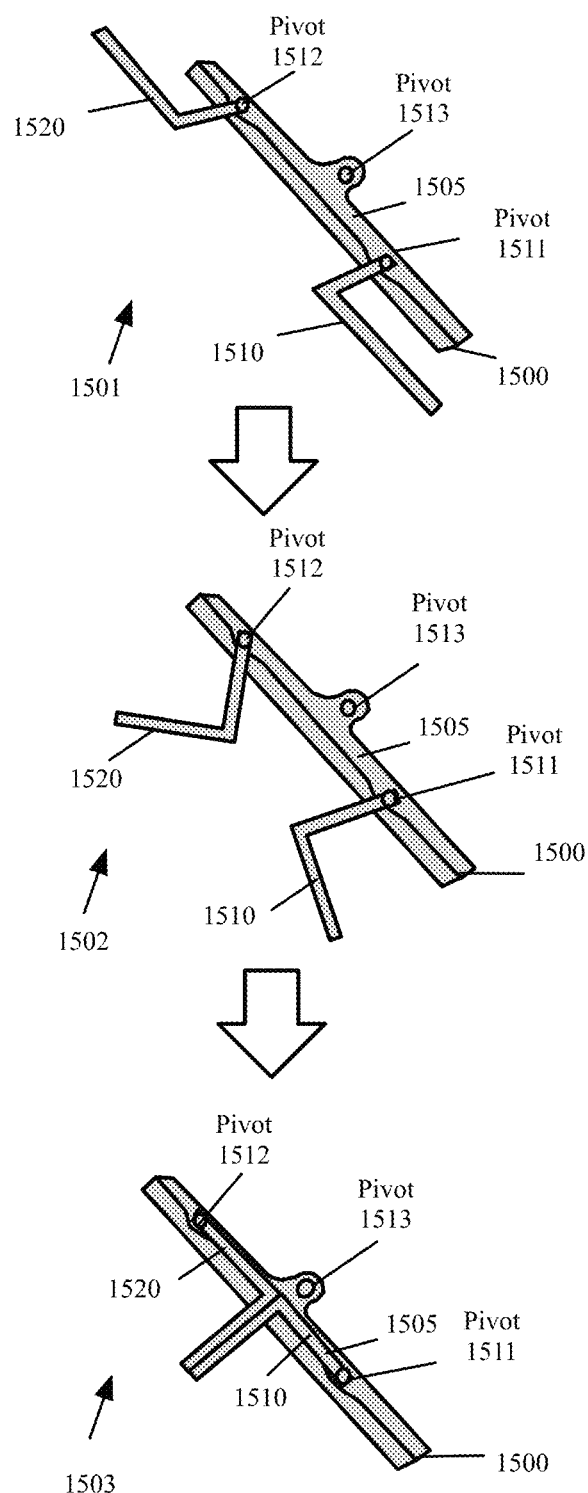
FIG. 15 illustrates a top perspective view of a tow truck wheel retainer with a cross bar and two L-shaped bars, according to prior art.

Some embodiments may use wheel retainers that include a cross bar and two L-shaped bars. FIG. 15 illustrates a top perspective view of a tow truck wheel retainer with a cross bar and two L-shaped bars, according to prior art. With reference to FIG. 15, the wheel retainer 1500 may have a cross bar 1505 with two L-shaped bars 1510 and 1520. The two sections of each L-shaped bar 1510 and 1520 may intersect each other at a substantially 90 degrees angel. The two L-shaped bars 1510 and 1520 may be attached to the cross bar 1505 by the pivots 1511-1512, respectively. The two L-shaped bars 1510 and 1520, in some embodiments, may be attached to the cross bar 1505 by rotating plates (not shown) or by a small hydraulic arms (not shown) that may connect the L-shaped bars 1510 and 1520 to the cross bar 1505.

FIG. 15, as shown, includes three operational stages 1501-1503. In stage 1501, the L-shaped bars 1510 and 1520 are extended, for example, to hold against the wheels of a car being towed. In stage 1502, the two L-shaped bars 1510 and 1520 are being rotated around the pivots 1511-1512, respectively. In stage 1503, the two L-shaped bars 1510 and 1520 are folded over the cross bar 1505, for example, after the completion of a towing task.

Figure 16A:
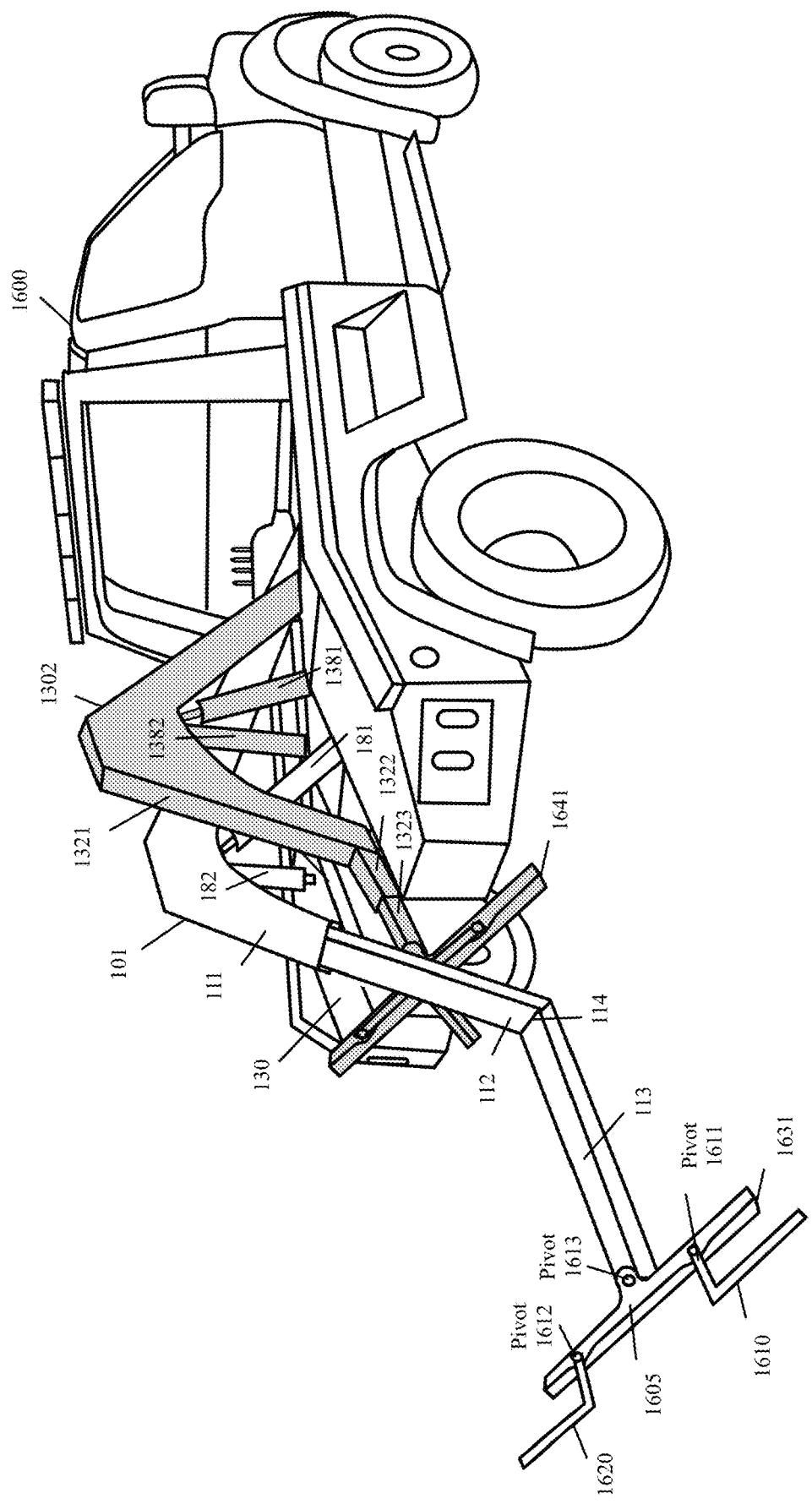
FIGS. 16A-16B are side perspective views of a tow truck with two hydraulic wheel lift assemblies where each hydraulic wheel lift assembly is attached to a wheel retainer with a cross bar and two L-shaped bars, according to various aspects of the present disclosure.
Figure 16B:
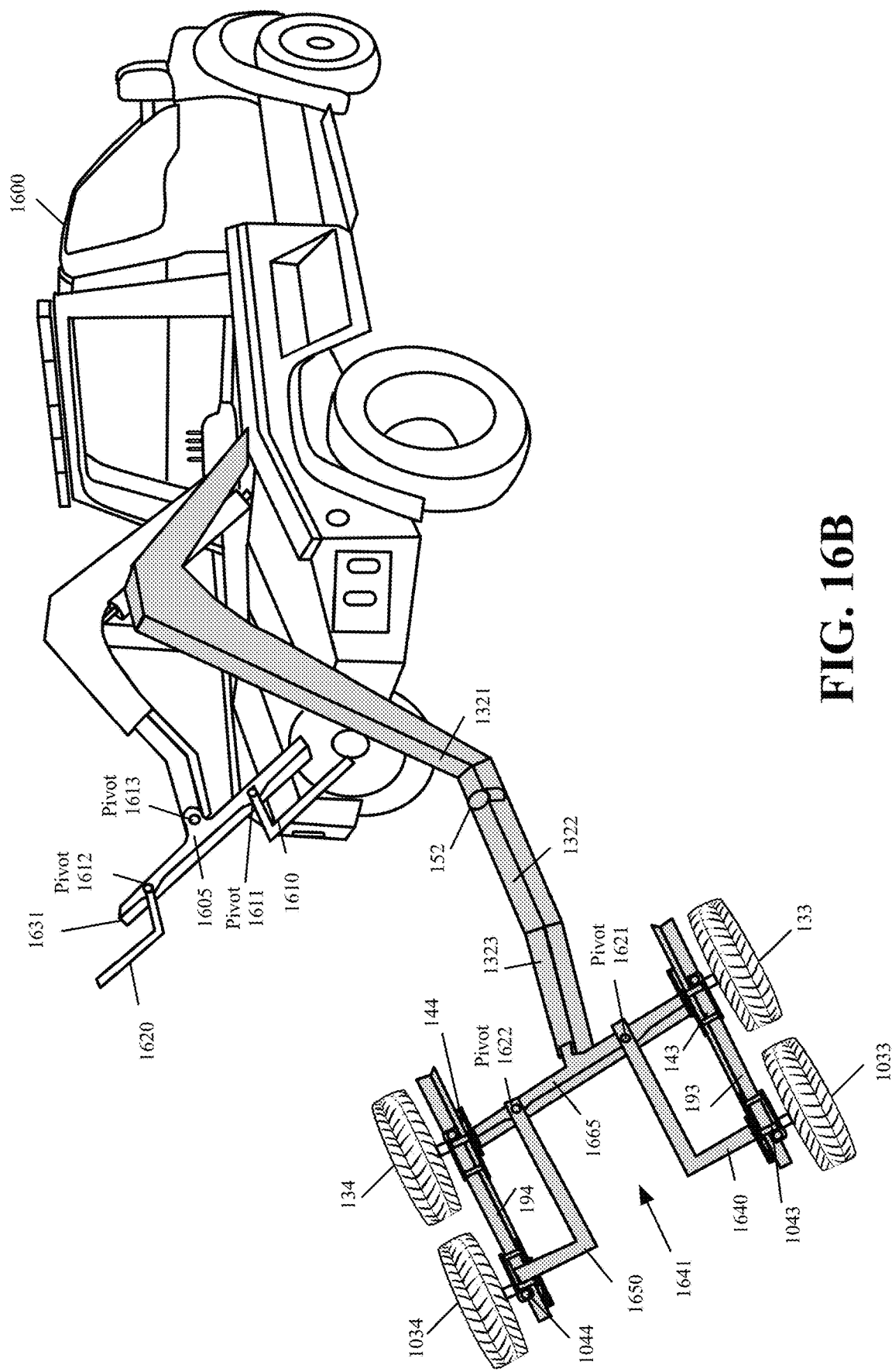

FIGS. 16A-16B are side perspective views of a tow truck 1600 with two hydraulic wheel lift assemblies where each hydraulic wheel lift assembly may be attached to a wheel retainer with a cross bar and two L-shaped bars, according to various aspects of the present disclosure. The tow truck 1600 includes a first hydraulic wheel lift assembly 101 and a second hydraulic wheel lift assembly 1221, which may be similar to the hydraulic wheel lift assemblies 101 and 1221 of FIGS. 12A-12B.

With reference to FIGS. 16A-16B, the first hydraulic wheel lift assembly 101 may include the wheel retainer 1631, which may be similar to the wheel retainer 1500 of FIG. 15. The wheel retainer 1631 may include the cross bar 1605, the L-shaped bars 1610 and 1620, which may be connected to the cross bar 1605 by the pivots 1611 and 1612, respectively. The cross bar 1605 may be connected to the bar 113 of the first hydraulic wheel lift 101 by the pivot 1613.

With continued reference to FIGS. 16A-16B, the second hydraulic wheel lift assembly 1202 may include the wheel retainer 1641. The wheel retainer 1641, as shown in FIG. 16B, may include the cross bar 1665, the L-shaped bars 1640 and 1650, which may be connected to the cross bar 1665 by the pivots 1621 and 1622, respectively. The cross bar 1665 may be fixedly connected to the bar 1223 of the second hydraulic wheel lift 1202.

The wheel retainer 1641 may be configured to be connected to towing wheels. In the example of FIG. 16B, the rods 193-194, the wheels 133, 1033, 134, 1034, and the spindles 143, 1043, 144, 1044 may be similar to the corresponding components of FIG. 10, described above. The wheel retainer structures 1631 and 1641 may also be used on other tow trucks of the present embodiments, such as, for example, the tow truck 100 of FIGS. 1A-1B, the tow truck 1700 of FIGS. 17A-17C, and the tow truck 1800 of FIG. 18.

Figure 17A:
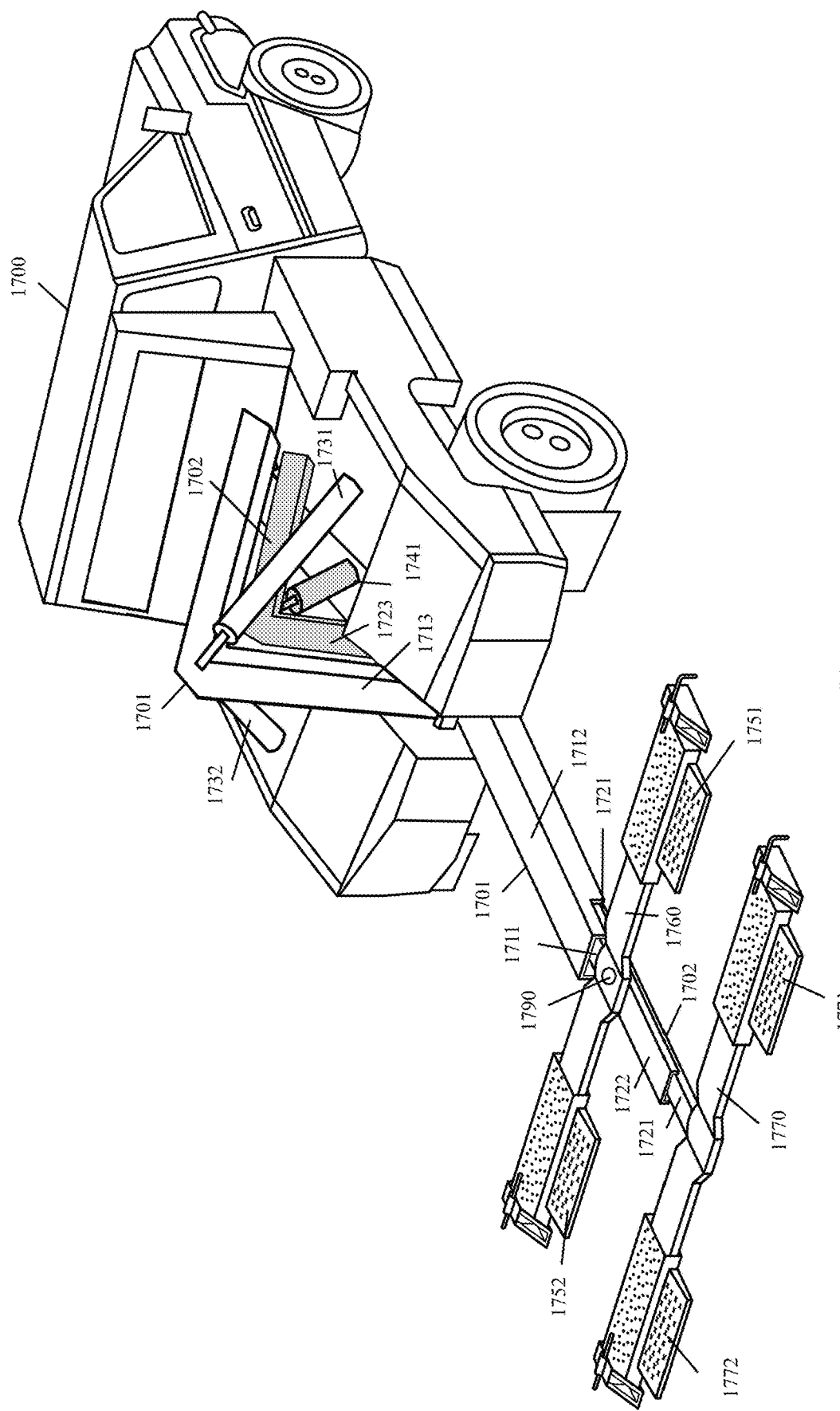
FIG. 17A is a side perspective view of a tow truck with two hydraulic wheel lift assemblies that may extend, for at least a portion of their lengths, through a common axis, according to various aspects of the present disclosure.
Figure 17B:
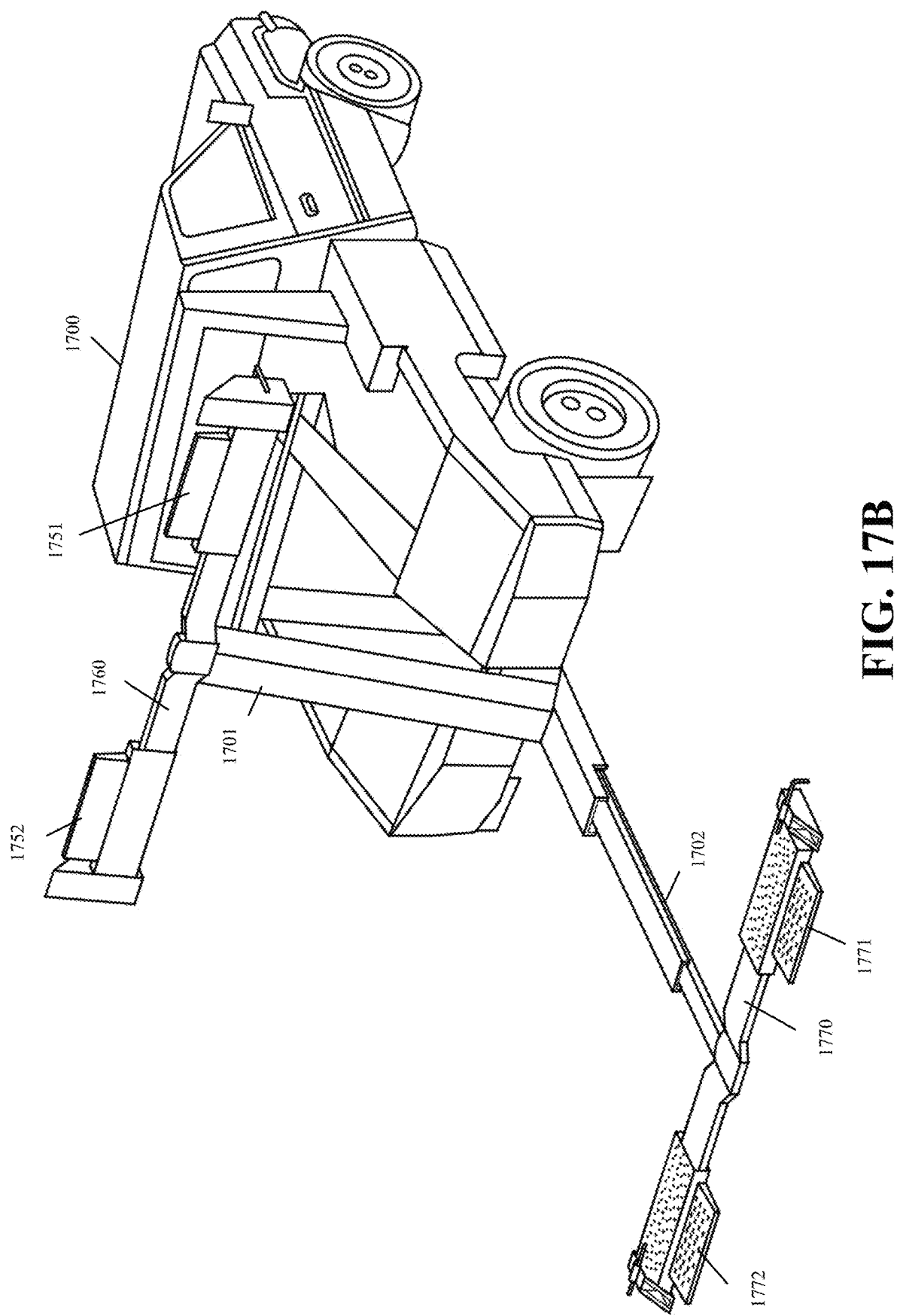
FIG. 17B is a side perspective view of the tow truck of FIG. 17A after the first hydraulic wheel lift assembly is lifted up, according to various aspects of the present disclosure.
Figure 17C:
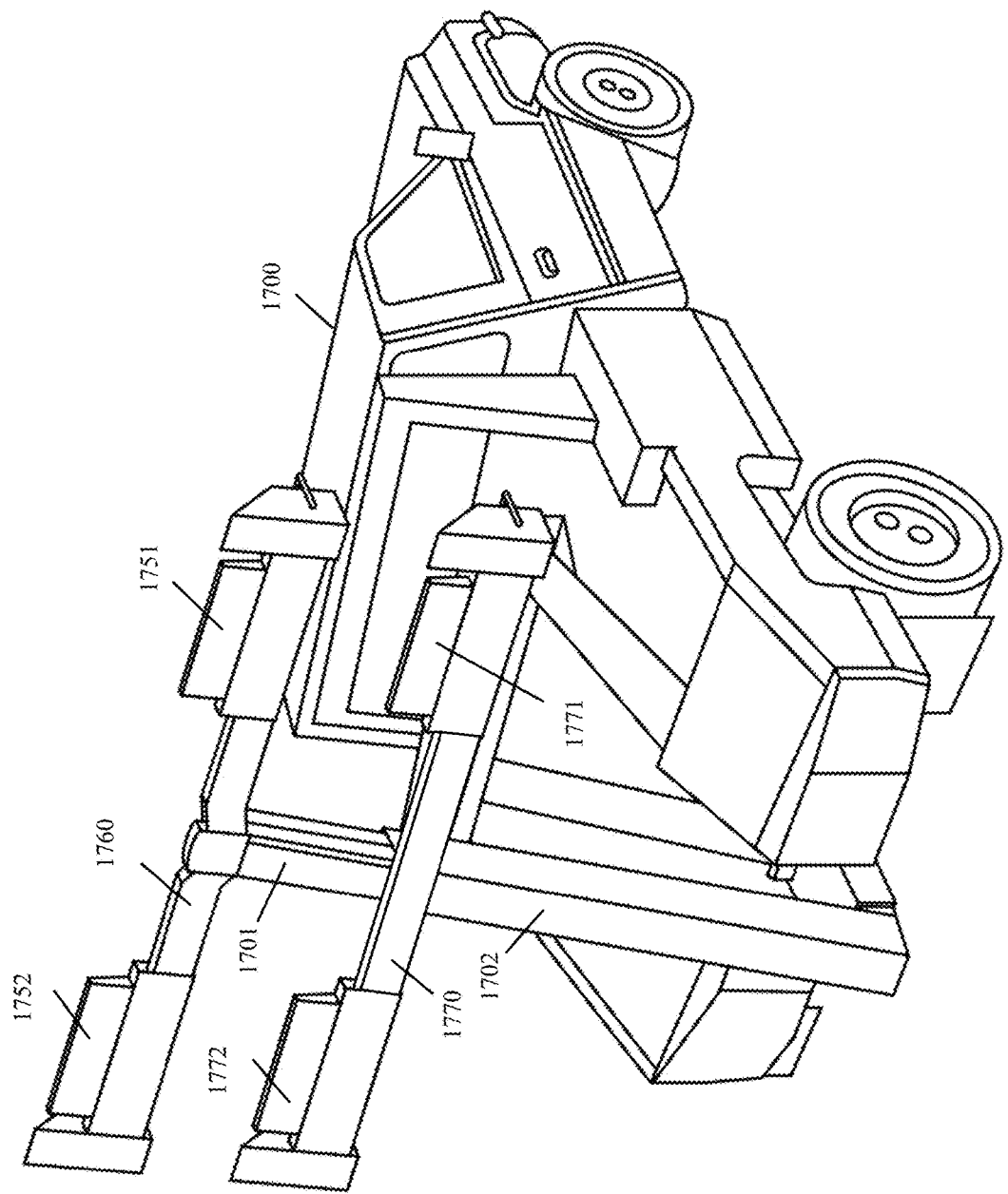
FIG. 17C is a side perspective view of the tow truck of FIG. 17A after both hydraulic wheel lift assemblies are lifted up, according to various aspects of the present disclosure.

In some embodiments, both of the first and second hydraulic wheel lift assemblies may extend, for at least a portion of their lengths, through a common axis. FIG. 17A is a side perspective view of a tow truck with two hydraulic wheel lift assemblies that may extend, for at least a portion of their lengths, through a common axis, according to various aspects of the present disclosure. FIG. 17B is a side perspective view of the tow truck of FIG. 17A after the first hydraulic wheel lift assembly is lifted up, according to various aspects of the present disclosure. FIG. 17C is a side perspective view of the tow truck of FIG. 17A after both hydraulic wheel lift assemblies are lifted up, according to various aspects of the present disclosure.

With reference to FIG. 17A, the tow truck 1700 may include a first hydraulic wheel lift assembly 1701 and the wheel retainers 1751 and 1752 for lifting the two wheels of a vehicle that are closer to the tow truck 1700. The tow truck 1700 may include a second hydraulic wheel lift assembly 1702 and the wheel retainers 1771 and 1772 for lifting the two wheels of the vehicle that are farther from the tow truck 1700.

The two hydraulic cylinders 1731-1732 may be configured to move the first hydraulic wheel lift 1701 up, down, forward, backward, and sideways. Other embodiments may include fewer or more than two hydraulic cylinders for moving the hydraulic wheel lift assembly 1701. The hydraulic wheel lift assembly 1701 may include several beams 1711-1713. The beams 1711-1713, in some embodiments, may have substantially rectangular cross sections. At least some of the beams, such as the beam 1712 may be hollow to facilitate a telescopic movement. In the example of FIG. 17A, the beams 1711 and 1712 are telescopic, with the beam 1711 having a smaller cross section than the beam 1712.

The beams 1712 and 1713 may move at an angle and tilt against each other around a hinge, or movable joint (not shown). In the example of FIG. 17A, the hydraulic wheel lift assembly 1701 is shown to include three beams 1711-1713, where the beam 1711 telescopically moves in and out of the beam 1712, and the beam 1712 may rotate around a hinge against the beam 1713. In other embodiments, the hydraulic wheel lift assembly 1701 may include fewer or more than three beams, may include more than two telescopic arms, may include more than two arms with hinges between them, may include no telescopic arms, or may include no hinges between the arms.

The hydraulic cylinder 1741 may be configured to move the hydraulic wheel lift assembly 1702 up, down, forward, or backward. Other embodiments may include no external hydraulic cylinders or more than one hydraulic cylinders for moving the hydraulic wheel lift 1702. The hydraulic wheel lift assembly 1702 may include several telescopic beams 1721-1723. In the perspective view of FIG. 17A, a portion of the beam 1722 of the second hydraulic wheel lift assembly 1702 is hidden under the arm 1712 of the first hydraulic wheel lift assembly 1701.

The beam 1721 may telescopically move in and out of the beam 1722 and the beam 1722 may rotate around a hinge (not shown) against the beam 1723. At least some of the beams, such as the beam 1722 may be hollow to facilitate the telescopic movements.

As shown, the hydraulic wheel lift assembly 1701 may be connected to a wheel retainer structure 1760 and the hydraulic wheel lift 1702 may be connected to a wheel retainer structure 1770. The wheel retainer structures 1760 and 1770 may be similar to any of the wheel retainer structures 160 and 170 (FIGS. 1A-1B), 1401-1402 (FIG. 14), 1500 (FIG. 15), and/or 1631 and 1641 (FIGS. 16A-16B). The wheel retainer structure 1760 may rotate against the beam 1722 around the pivot 1790. The wheel retainer structure 1770 may be used to attach to towing wheels (not shown), for example as described above with reference to FIGS. 1B, 7, 10, 11, 12B, 14, and/or 16B.

With reference to FIG. 17B, the first hydraulic wheel lift assembly 1701 is shown as lifted while the second hydraulic wheel lift assembly 1702 is extended above the ground. FIG. 17C shows the tow truck 1700 after both hydraulic wheel lift assemblies 1701 and 1702 are lifted up (e.g., when the tow truck 1700 is not towing a vehicle).

Figure 18:
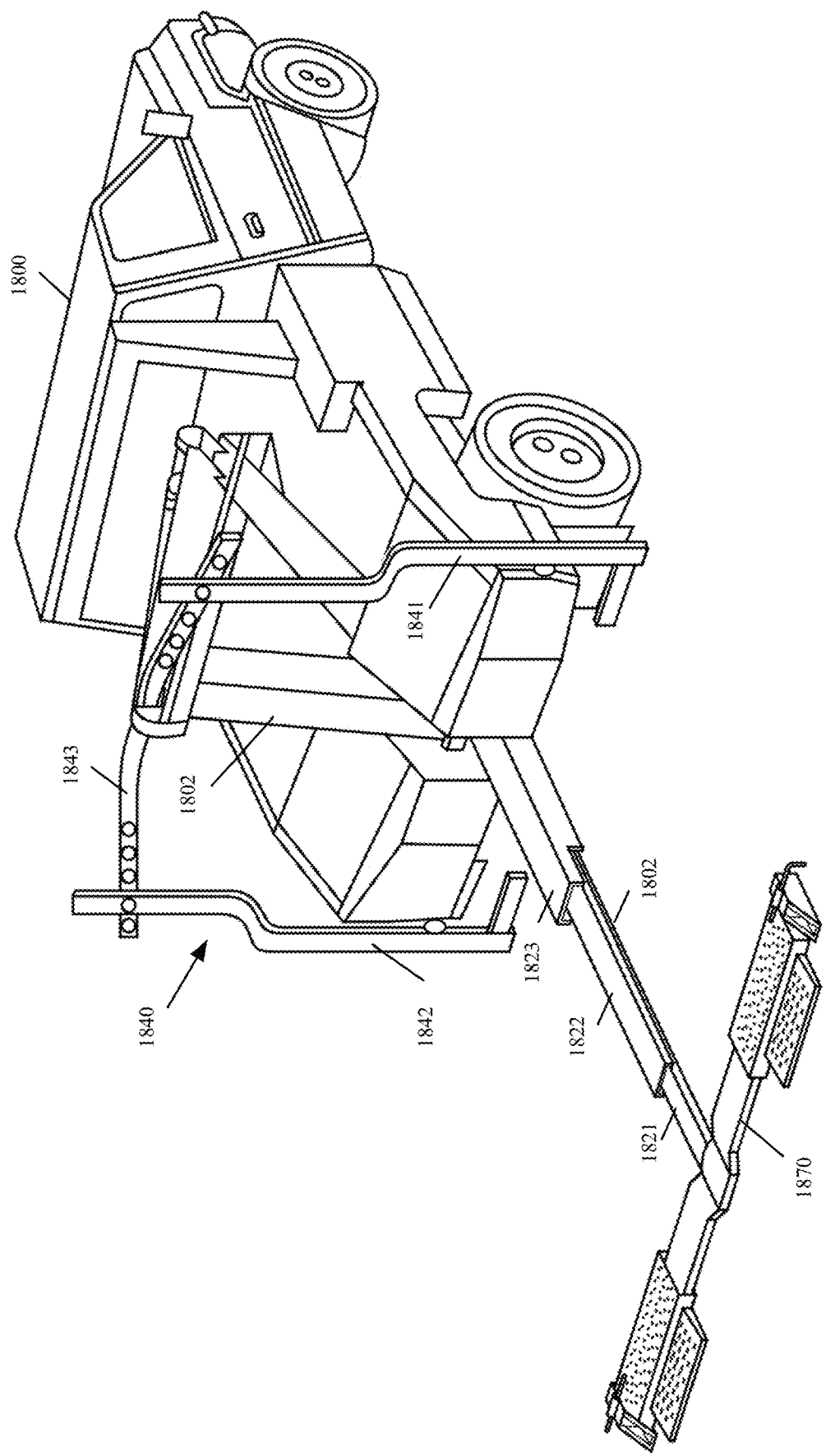
FIG. 18 is a side perspective view of a tow truck with a boom to lift the wheels of a vehicle that are closer to the tow truck and a hydraulic wheel lift assembly for placing towing wheels under the wheels of the vehicle that are father from the tow truck, according to various aspects of the present disclosure.

In some embodiments, the tow truck may include a boom to lift the wheels of a vehicle that are closer to the tow truck and a hydraulic wheel lift assembly for placing towing wheels under the wheels of the vehicle that are father from the tow truck. FIG. 18 is a side perspective view of a tow truck with a boom to lift the wheels of a vehicle that are closer to the tow truck and a hydraulic wheel lift assembly for placing towing wheels under the wheels of the vehicle that are father from the tow truck, according to various aspects of the present disclosure.

With reference to FIG. 18, the tow truck 1800 may include the boom 1840 for lifting the two wheels of a vehicle that are closer to the truck 1800 and a hydraulic wheel lift assembly 1802 for lifting the two wheels of the vehicle that are farther from the tow truck 1800. The boom 1840 may include a cross bar 1843 and two bars 1841 and 1842. The two bars 1841 and 1842 may be used to lift the two wheels of the vehicle being towed that are closer to the tow truck 1800.

The hydraulic wheel lift assembly 1802 may include several telescopic beams 1821-1823. The beam 1821 may telescopically move in and out of the beam 1822 and the beam 1822 may telescopically move in and out of the beam 1823. At least some of the beams, such as the beams 1822 and 1823 may be hollow to facilitate the telescopic movements.

As shown, the hydraulic wheel lift assembly 1802 may be connected to a wheel retainer structure 1870. The wheel retainer structure 1870 may be similar to any of the wheel retainer structures 170 (FIGS. 1A-1), 1470 (FIG. 14), 1500 (FIG. 15), and/or 1641 (FIGS. 16A-16B). The wheel retainer structure 1870 may be used to attach to towing wheels, for example as described above with reference to FIGS. 1B, 7, 10, 11, 12B, 14, and/or 16B.

In a first aspect, a wheel lift apparatus of a tow truck is provided. The wheel lift apparatus comprises: a first hydraulic wheel lift assembly comprising a first set of one or more hydraulically operated arms configured to lift a first pair of wheels of a vehicle off the ground; and a second hydraulic wheel lift assembly configured to extend and retract below the first hydraulic wheel lift assembly, the second hydraulic wheel lift assembly comprising: a second set of one or more hydraulically operated arms; and a wheel retainer structure connected to the second set of hydraulically operated arms, the wheel retainer structure configured to hold a second pair of wheels of the vehicle, which are farther to the tow truck than the first pair of wheels, the wheel retainer structure comprising: a first shaft configured to connect to a first towing wheel that keeps a first wheel in the second pair of the wheels of the vehicle off the ground; a first wheel retainer configured to hold the first wheel in the second pair of the wheels of the vehicle; a second shaft configured to connect to a second towing wheel that keeps a second wheel in the second pair of the wheels of the vehicle off the ground; and a second wheel retainer configured to hold the second wheel in the second pair of the wheels of the vehicle.

In an embodiment of the first aspect, the wheel retainer structure comprises: a cross bar connected to a hydraulically operated arm in the second set of hydraulically operated arms, wherein the first and second wheel retainers are fixedly connected to the cross bar, wherein the cross bar comprises first and second ends; a first rod movably connected to the first end of cross bar, and fixedly connected to the first shaft; and a second rod movably connected to second first end of cross bar, and fixedly connected to the second shaft.

An embodiment of the first aspect further comprises: a first bracket fixedly connected to the first end of the cross bar, wherein the first bracket is configured to hold the first rod; and a second bracket fixedly connected to second first end of the cross bar, wherein the second bracket is configured to hold the second rod.

Another embodiment of the first aspect further comprises: a third wheel retainer detachably connected to the first end of the cross bar through the first bracket, wherein the third wheel retainer is configured to hold the first wheel in the second pair of the wheels of the vehicle, wherein the first and third wheel retainers hold two substantially opposite sides of the first wheel; and a fourth wheel retainer detachably connected to the second end of the cross bar through the second bracket, wherein the fourth wheel retainer is configured to hold the second wheel in the second pair of the wheels of the vehicle, wherein the second and fourth wheel retainers hold two substantially opposite sides of the second wheel.

Another embodiment of the first aspect further comprises: at least one hydraulic cylinder that moves the first set of one or more hydraulically operated arms; and at least one hydraulic cylinder that moves the second set of one or more hydraulically operated arms.

In another embodiment of the first aspect, the first wheel retainer comprises a first set of one or more rollers; the second wheel retainer comprises a second set of one or more rollers; and the first and second set of rollers are configured to allow the second pair of wheels of the vehicle to role.

In another embodiment of the first aspect, the first wheel retainer comprises a plurality of pairs of holes, each pair of holes configured to removably connect a roller in the first set of rollers to the first wheel retainer.

In another embodiment of the first aspect, the second wheel retainer comprises a plurality of pairs of holes, each pair of holes configured to removably connect a roller in the second set of rollers to the second wheel retainer.

In another embodiment of the first aspect, the first and second sets of rollers are made of a material comprising one of metal, rubber, carbon fiber, and graphite.

In another embodiment of the first aspect, the wheel retainer structure is a first wheel retainer structure, the first hydraulic wheel lift assembly comprising a second wheel retainer structure connected to the first set of hydraulically operated arms, the second wheel retainer structure configured to hold the first pair of wheels of the vehicle, wherein the second wheel retainer structure comprises: a third wheel retainer comprising a first set of one or more rollers, the third wheel retainer configured to hold a first wheel in the first pair of the vehicle; a fourth wheel retainer comprising a second set of one or more rollers, the fourth wheel retainer configured to hold a second wheel in the first pair of the vehicle; wherein the first and second set of one or more rollers are configured to allow the first pair of wheels to role when the second pair of wheels are placed on the ground and move.

In another embodiment of the first aspect, the third wheel retainer comprises a plurality of pairs of holes, each pair of holes configured to removably connect a roller in the first set of rollers to the third wheel retainer.

In another embodiment of the first aspect, the fourth wheel retainer comprises a plurality of pairs of holes, each pair of holes configured to removably connect a roller in the second set of rollers to the fourth wheel retainer.

In another embodiment of the first aspect, the second wheel retainer structure comprises: a cross bar connected to a hydraulically operated arm in the first set of hydraulically operated arms, wherein the third and fourth wheel retainers are fixedly connected to the cross bar, wherein the cross bar comprises first and second ends; a first rod movably connected to the first end of cross bar, and fixedly connected to the first shaft; and a second rod movably connected to second first end of cross bar, and fixedly connected to the second shaft.

Another embodiment of the first aspect further comprises: a first bracket fixedly connected to the first end of the cross bar, wherein the first bracket is configured to hold the first rod; and a second bracket fixedly connected to second first end of the cross bar, wherein the second bracket is configured to hold the second rod.

Another embodiment of the first aspect further comprises a fifth wheel retainer detachably connected to the first end of the cross bar through the first bracket, wherein the fifth wheel retainer is configured to hold the first wheel in the first pair of the wheels of the vehicle, wherein the third and fifth wheel retainers hold two substantially opposite sides of the first wheel of the first pair of the wheels of the vehicle; and a sixth wheel retainer detachably connected to the second end of the cross bar through the second bracket, wherein the sixth wheel retainer is configured to hold the second wheel in the first pair of the wheels of the vehicle, wherein the fourth and sixth wheel retainers hold two substantially opposite sides of the second wheel in the first pair of the wheels of the vehicle.

Another embodiment of the first aspect further comprises a first pivot, wherein the cross bar and said hydraulically operated arm in the first set of hydraulically operated arms are connected by the first pivot.

Another embodiment of the first aspect further comprises a second pivot connecting two hydraulically operated arms in the second set of hydraulically operated arms, wherein the first and second pivots substantially position in a same vertical plane when the first and second hydraulic wheel lift assemblies are fully extended.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A wheel lift apparatus of a tow truck, the wheel lift apparatus comprising:
a first hydraulic wheel lift assembly comprising:
a first set of one or more hydraulically operated arms configured to attach to a body of the tow truck at a first location; and
a first wheel retainer structure connected to the first set of hydraulically operated arms, the first wheel retainer structure configured to hold a first pair of wheels of a vehicle off the ground during a towing operation; and
a second hydraulic wheel lift assembly configured to extend and retract below the first hydraulic wheel lift assembly, the second hydraulic wheel lift assembly comprising:
a second set of one or more hydraulically operated arms configured to attach to the body of the tow truck at a second location; and
a second wheel retainer structure connected to the second set of hydraulically operated arms, the second wheel retainer structure configured to hold a second pair of wheels of the vehicle, which are located farther to the tow truck than the first pair of wheels, during the towing operation, the second wheel retainer structure comprising:
a first shaft configured to connect to a first towing wheel that keeps a first wheel in the second pair of the wheels of the vehicle off the ground;
a first wheel retainer configured to hold the first wheel in the second pair of the wheels of the vehicle;
a second shaft configured to connect to a second towing wheel that keeps a second wheel in the second pair of the wheels of the vehicle off the ground; and
a second wheel retainer configured to hold the second wheel in the second pair of the wheels of the vehicle.

2. The wheel lift apparatus of claim 1, wherein the second wheel retainer structure comprises:
   a cross bar connected to a hydraulically operated arm in the second set of hydraulically operated arms, wherein the first and second wheel retainers are fixedly connected to the cross bar, wherein the cross bar comprises first and second ends;
   a first rod movably connected to the first end of cross bar, and fixedly connected to the first shaft; and
   a second rod movably connected to second first end of cross bar, and fixedly connected to the second shaft.

3. The wheel lift apparatus of claim 2 further comprising:
   a first bracket fixedly connected to the first end of the cross bar, wherein the first bracket is configured to hold the first rod; and
   a second bracket fixedly connected to second first end of the cross bar, wherein the second bracket is configured to hold the second rod.

4. The wheel lift apparatus of claim 3 further comprising:
   a third wheel retainer detachably connected to the first end of the cross bar through the first bracket, wherein the third wheel retainer is configured to hold the first wheel in the second pair of the wheels of the vehicle, wherein the first and third wheel retainers hold two substantially opposite sides of the first wheel; and
   a fourth wheel retainer detachably connected to the second end of the cross bar through the second bracket, wherein the fourth wheel retainer is configured to hold the second wheel in the second pair of the wheels of the vehicle, wherein the second and fourth wheel retainers hold two substantially opposite sides of the second wheel.

5. The wheel lift apparatus of claim 1 further comprising:
   at least one hydraulic cylinder that moves the first set of one or more hydraulically operated arms; and
   at least one hydraulic cylinder that moves the second set of one or more hydraulically operated arms.

6. The wheel lift apparatus of claim 1,
   wherein the first wheel retainer comprises a first set of one or more rollers;
   wherein the second wheel retainer comprises a second set of one or more rollers; and
   wherein the first and second set of rollers are configured to allow the second pair of wheels of the vehicle to role.

7. The wheel lift apparatus of claim 6, wherein the first wheel retainer comprises a plurality of pairs of holes, each pair of holes configured to removably connect a roller in the first set of rollers to the first wheel retainer.

8. The wheel lift apparatus of claim 6, wherein the second wheel retainer comprises a plurality of pairs of holes, each pair of holes configured to removably connect a roller in the second set of rollers to the second wheel retainer.

9. The wheel lift apparatus of claim 6, wherein the first and second sets of rollers are made of a material comprising one of metal, rubber, carbon fiber, and graphite.

10. The wheel lift apparatus of claim 1, wherein the first wheel retainer structure comprises:
    a third wheel retainer comprising a first set of one or more rollers, the third wheel retainer configured to hold a first wheel in the first pair of wheels of the vehicle; and
    a fourth wheel retainer comprising a second set of one or more rollers, the fourth wheel retainer configured to hold a second wheel in the first pair of wheels of the vehicle;
    wherein the first and second set of one or more rollers are configured to allow the first pair of wheels to role when the second pair of wheels are placed on the ground and move.

11. The wheel lift apparatus of claim 10, wherein the third wheel retainer comprises a plurality of pairs of holes, each pair of holes configured to removably connect a roller in the first set of rollers to the third wheel retainer.

12. The wheel lift apparatus of claim 10, wherein the fourth wheel retainer comprises a plurality of pairs of holes, each pair of holes configured to removably connect a roller in the second set of rollers to the fourth wheel retainer.

13. The wheel lift apparatus of claim 10, wherein the first wheel retainer structure comprises:
    a cross bar connected to a hydraulically operated arm in the first set of hydraulically operated arms, wherein the third and fourth wheel retainers are fixedly connected to the cross bar, wherein the cross bar comprises first and second ends;
    a first rod movably connected to the first end of cross bar, and fixedly connected to the first shaft; and
    a second rod movably connected to second first end of cross bar, and fixedly connected to the second shaft.

14. The wheel lift apparatus of claim 13 further comprising:
    a first bracket fixedly connected to the first end of the cross bar, wherein the first bracket is configured to hold the first rod; and
    a second bracket fixedly connected to second first end of the cross bar, wherein the second bracket is configured to hold the second rod.

15. The wheel lift apparatus of claim 14 further comprising:
    a fifth wheel retainer detachably connected to the first end of the cross bar through the first bracket, wherein the fifth wheel retainer is configured to hold the first wheel in the first pair of the wheels of the vehicle, wherein the third and fifth wheel retainers hold two substantially opposite sides of the first wheel of the first pair of the wheels of the vehicle; and
    a sixth wheel retainer detachably connected to the second end of the cross bar through the second bracket, wherein the sixth wheel retainer is configured to hold the second wheel in the first pair of the wheels of the vehicle, wherein the fourth and sixth wheel retainers hold two substantially opposite sides of the second wheel in the first pair of the wheels of the vehicle.

16. The wheel lift apparatus of claim 14 further comprising:
    a first pivot, wherein the cross bar and said hydraulically operated arm in the first set of hydraulically operated arms are connected by the first pivot.

17. The wheel lift apparatus of claim 16 further comprising:
    a second pivot connecting two hydraulically operated arms in the second set of hydraulically operated arms, wherein the first and second pivots substantially position in a same vertical plane when the first and second hydraulic wheel lift assemblies are fully extended.

* * * * *